(12) United States Patent
Wang et al.

(10) Patent No.: US 11,297,345 B2
(45) Date of Patent: Apr. 5, 2022

(54) INTRA PREDICTION MODE DERIVATION BASED ON NEIGHBORING BLOCKS

(71) Applicant: HUAWEI TECHNOLOGIES CO., LTD., Guangdong (CN)

(72) Inventors: Biao Wang, Munich (DE); Anand Meher Kotra, Munich (DE); Semih Esenlik, Munich (DE); Jianle Chen, San Diego, CA (US); Zhijie Zhao, Munich (DE); Han Gao, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/000,765

(22) Filed: Aug. 24, 2020

(65) Prior Publication Data
US 2020/0389668 A1    Dec. 10, 2020

Related U.S. Application Data

(63) Continuation of application No. PCT/CN2019/107142, filed on Sep. 21, 2019.

(60) Provisional application No. 62/734,877, filed on Sep. 21, 2018.

(51) Int. Cl.
  *H04N 19/593* (2014.01)
  *H04N 19/176* (2014.01)
  *H04N 19/44* (2014.01)

(52) U.S. Cl.
  CPC ......... *H04N 19/593* (2014.11); *H04N 19/176* (2014.11); *H04N 19/44* (2014.11)

(58) Field of Classification Search
  CPC .......................... H04N 19/159; H04N 19/593
  See application file for complete search history.

(56) References Cited

U.S. PATENT DOCUMENTS

| | | | |
|---|---|---|---|
| 2012/0224777 A1 | 9/2012 | Kim et al. | |
| 2016/0373769 A1* | 12/2016 | Zhao | H04N 19/82 |
| 2017/0272745 A1* | 9/2017 | Liu | H04N 19/157 |
| 2017/0332084 A1* | 11/2017 | Seregin | H04N 19/176 |
| 2018/0063553 A1* | 3/2018 | Zhang | H04N 19/463 |

(Continued)

FOREIGN PATENT DOCUMENTS

| | | |
|---|---|---|
| CN | 103959789 A | 7/2014 |
| CN | 106851300 A | 6/2017 |

(Continued)

*Primary Examiner* — Mainul Hasan
(74) *Attorney, Agent, or Firm* — Womble Bond Dickinson (US) LLP

(57) ABSTRACT

A method for constructing a Most Probable Mode (MPM) list for intra prediction, the method comprising: determining whether a left neighboring block of a current coding block is available or not; determining whether an above neighboring block of the current coding block is available or not; using a Planar mode, a DC mode, a vertical mode (VER_IDX), a horizontal mode (HOR_IDX), an intra prediction mode corresponding to the vertical mode with an offset −4, an intra prediction mode corresponding to the vertical mode with an offset 4, to obtain a value of an intra prediction mode for the current coding block when one of conditions is satisfied. The MPM list is used to obtain an index value corresponding to a prediction mode of a picture block, so as to improve coding efficiency.

6 Claims, 10 Drawing Sheets

(56) References Cited

U.S. PATENT DOCUMENTS

| | | | |
|---|---|---|---|
| 2018/0098064 A1* | 4/2018 | Seregin | H04N 19/11 |
| 2019/0281289 A1* | 9/2019 | Zhao | H04N 19/196 |
| 2020/0036969 A1* | 1/2020 | Sarwer | H04N 19/11 |
| 2020/0092544 A1* | 3/2020 | Zhao | H04N 19/103 |
| 2020/0296417 A1* | 9/2020 | Ko | H04N 19/463 |
| 2021/0176492 A1* | 6/2021 | Kim | H04N 19/157 |

FOREIGN PATENT DOCUMENTS

| | | | |
|---|---|---|---|
| CN | 107105251 A | 8/2017 | |
| WO | WO-2020050697 A1 * | 3/2020 | H04N 19/11 |
| WO | WO-2020055159 A1 * | 3/2020 | H04N 19/593 |

* cited by examiner

INTRA PREDICTION MODE DERIVATION BASED ON NEIGHBORING BLOCKS

CROSS-REFERENCE TO RELATED APPLICATIONS

This application is a continuation of International Application No. PCT/CN2019/107142, filed on Sep. 21, 2019, which claims the priority to U.S. Provisional Patent Application No. 62/734,877, filed Sep. 21, 2018. All of the afore-mentioned patent applications are hereby incorporated by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has led to larger data streams that are nowadays commonly transported over internet and mobile communication networks.

Higher resolution videos, however, typically need more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC a coding unit (CU) is split into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (WET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The VTM (Versatile Test Model) standard uses 35 Intra modes whereas the BMS (Benchmark Set) uses 67 Intra modes.

The intra mode coding scheme currently described in BMS is considered complex and a disadvantage of non-selected mode set is that the index list is always constant and not adaptive based on the current block properties (for e.g. its neighboring blocks INTRA modes).

SUMMARY

Apparatus and method for intra prediction are disclosed. The apparatus and method use a mapping process to simplify the calculation procedure for intra prediction, so as to improve coding efficiency. The scope of protection is defined by the claims.

BRIEF DESCRIPTION OF DRAWINGS

The following embodiments are described in more detail with reference to the attached figures and drawings, in which.

DETAILED DESCRIPTION

In the following description, reference is made to the accompanying drawings, which form part of the disclosure, and in which are shown, by way of illustration, specific aspects in which the present disclosure may be placed.

For instance, it is understood that a disclosure in connection with a described method may also hold true for a corresponding device or system configured to perform the method and vice versa. For example, when a specific method operation is described, a corresponding device may include a unit to perform the described method operation, even when such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

Figure 1:
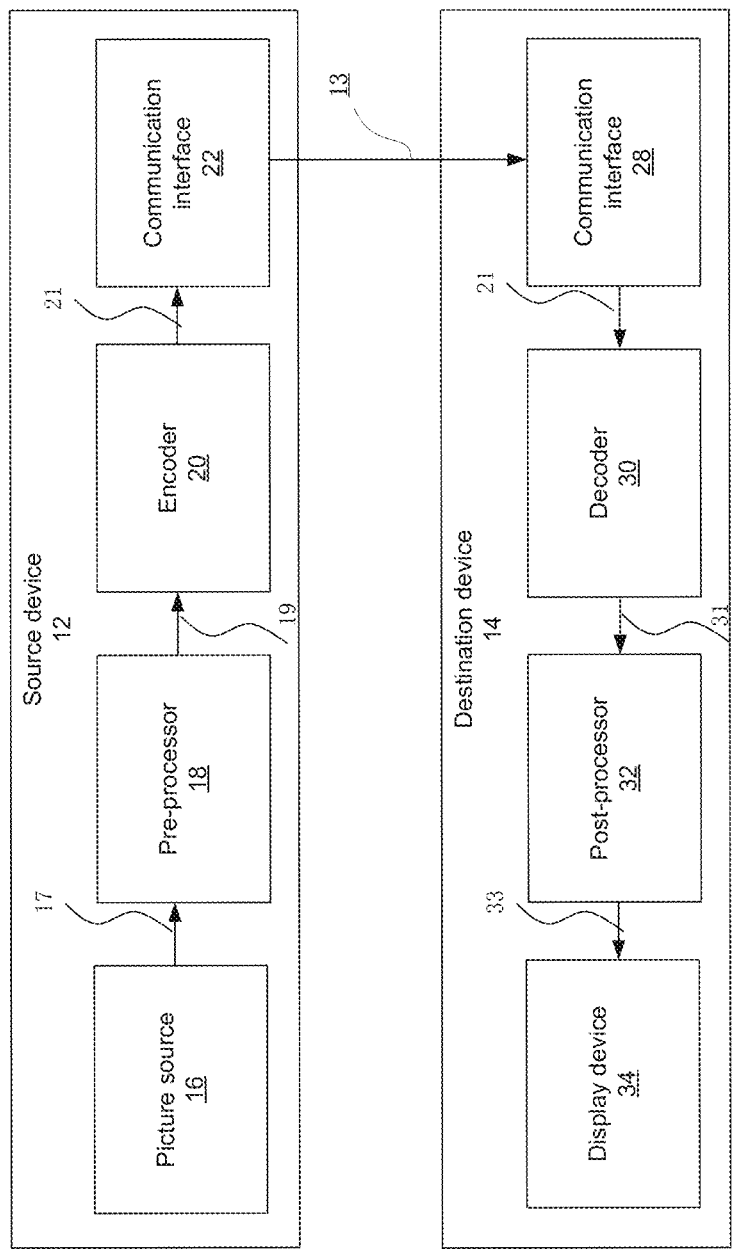
FIG. 1 is a block diagram showing an example of a video coding system configured to implement embodiments of the present disclosure.

FIG. 1 is a conceptual or schematic block diagram illustrating an example coding system 10, e.g. a video coding system 10 that may utilize techniques of this present application. Encoder 20 (e.g. video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space, a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. When a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
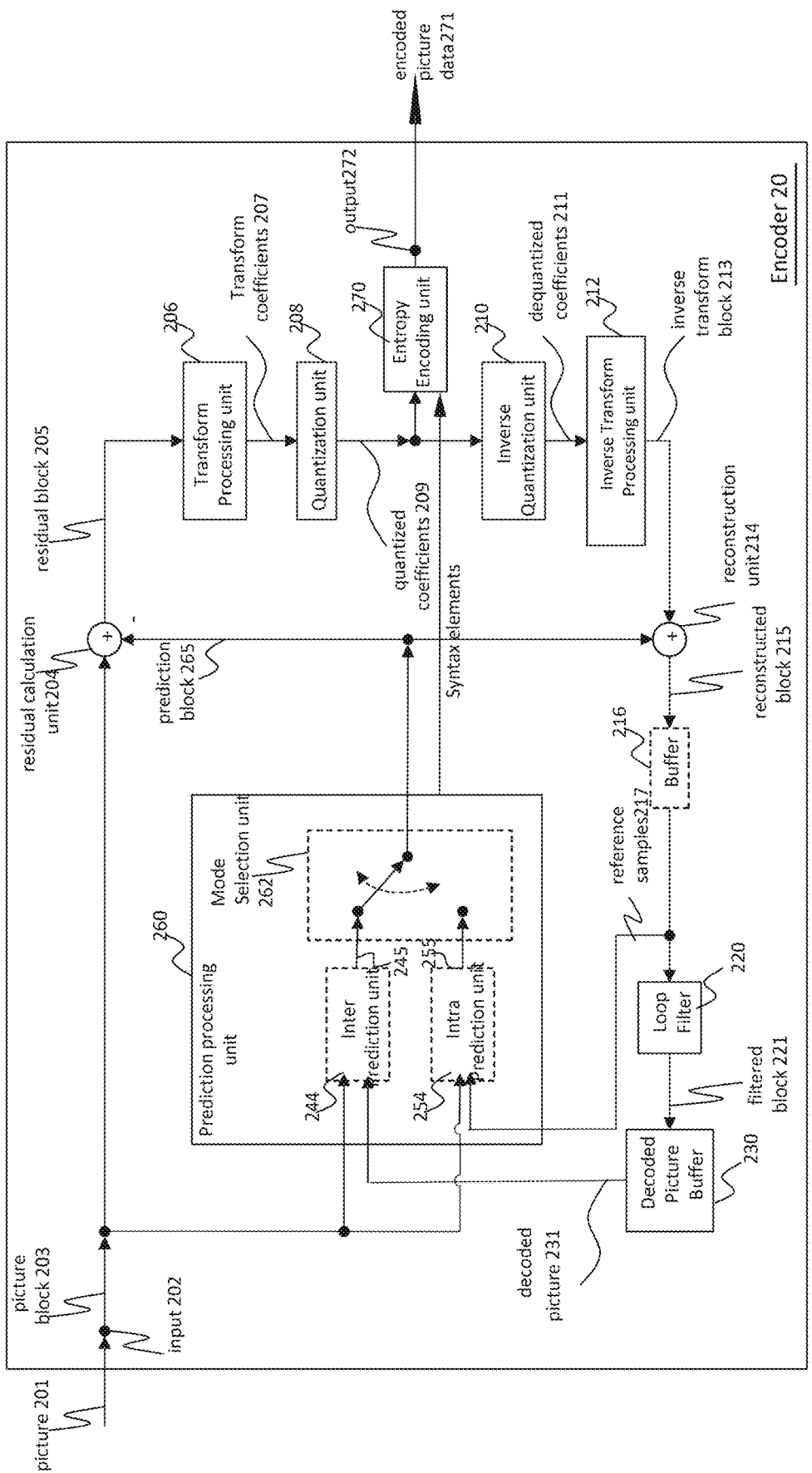
FIG. 2 is a block diagram showing an example of a video encoder configured to implement embodiments of the present disclosure.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
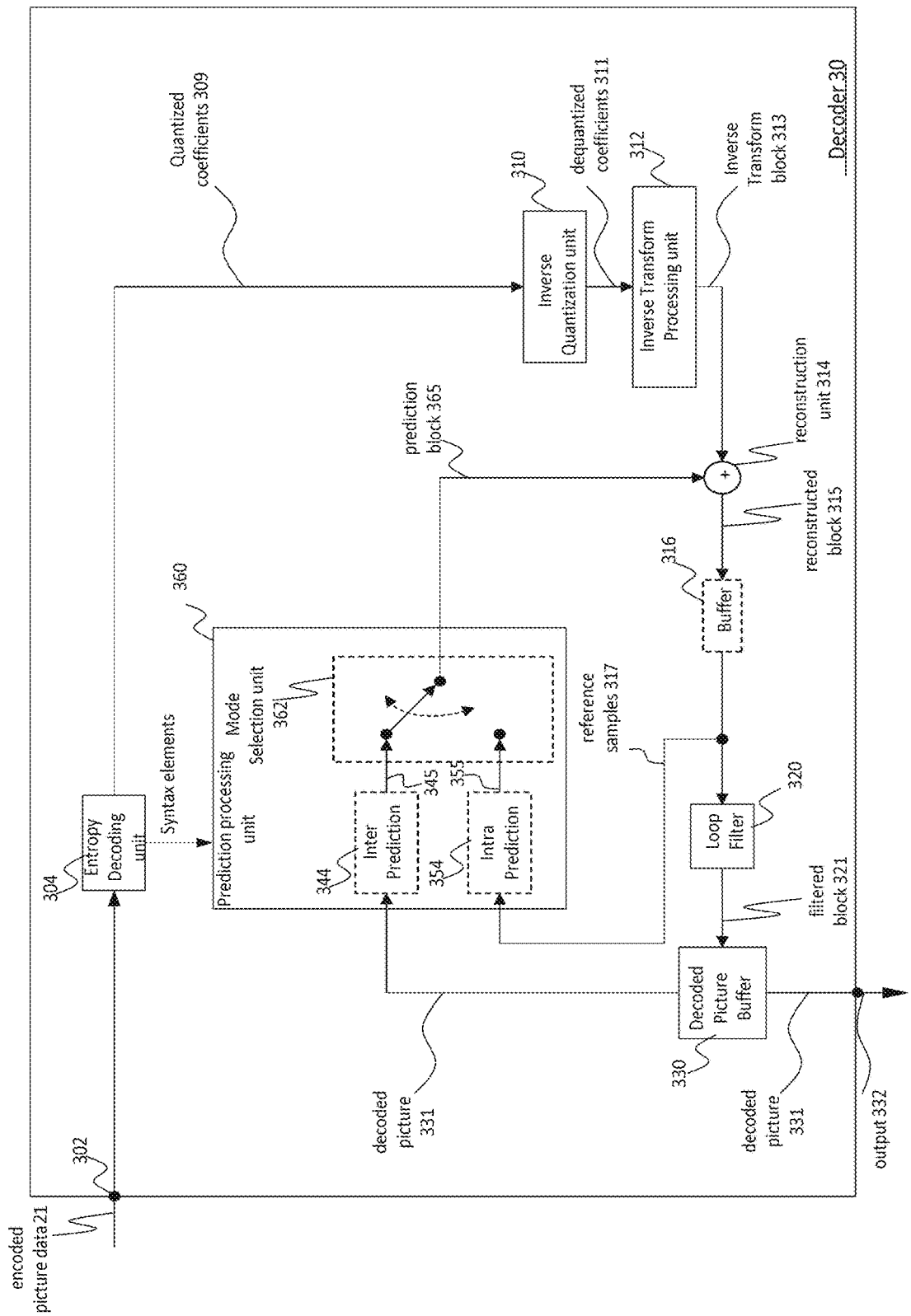
FIG. 3 is a block diagram showing an example structure of a video decoder configured to implement embodiments of the present disclosure according to an embodiment.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
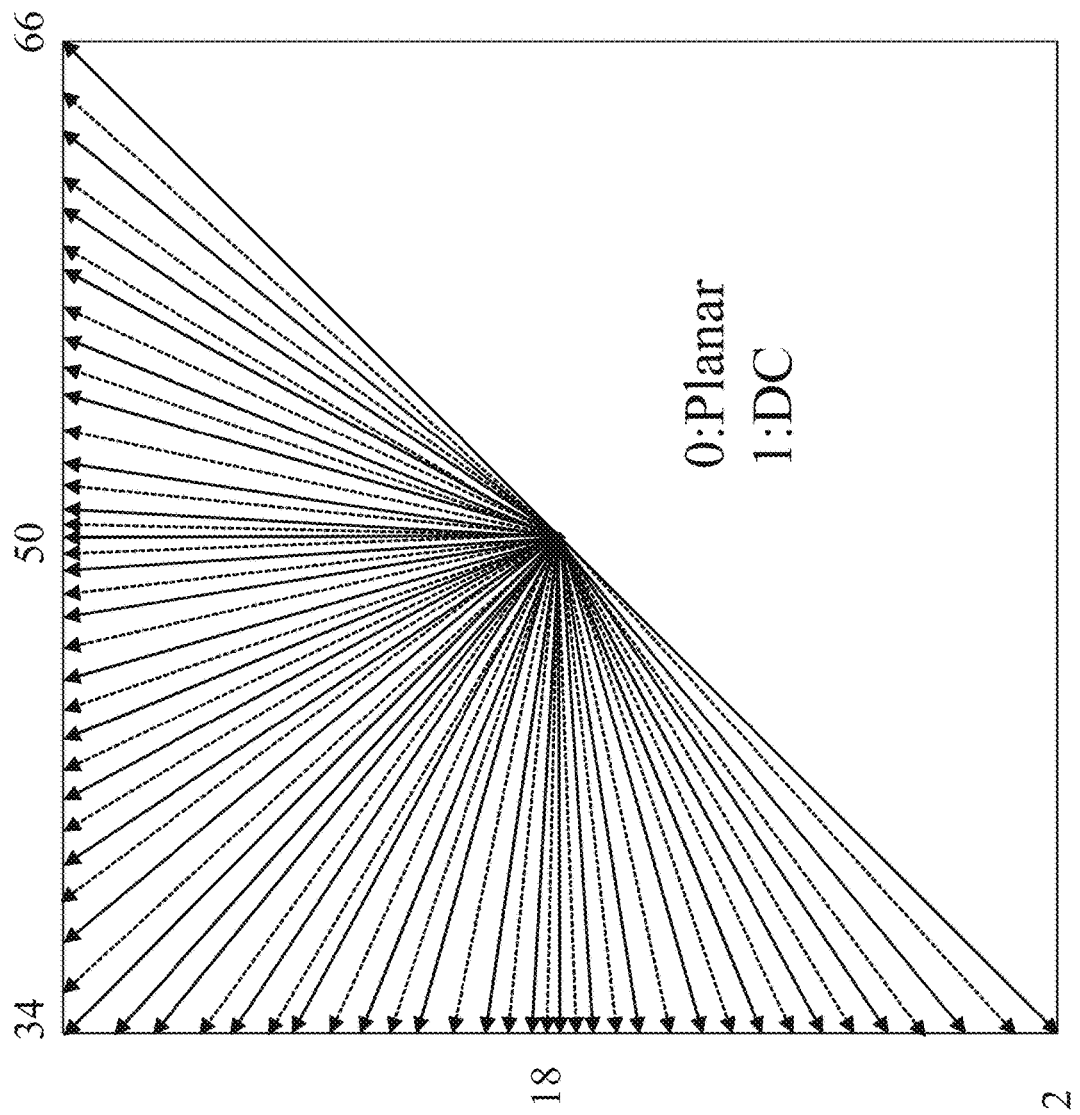
FIG. 4 shows a schematic diagram illustrating the proposed 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (when needed) filter them to get a sample predictor. The number of reference samples needed for constructing a predictor depends on the length of the filter used for interpolation (e.g., bilinear and cubic filters have lengths of 2 and 4, respectively).

Figure 7:
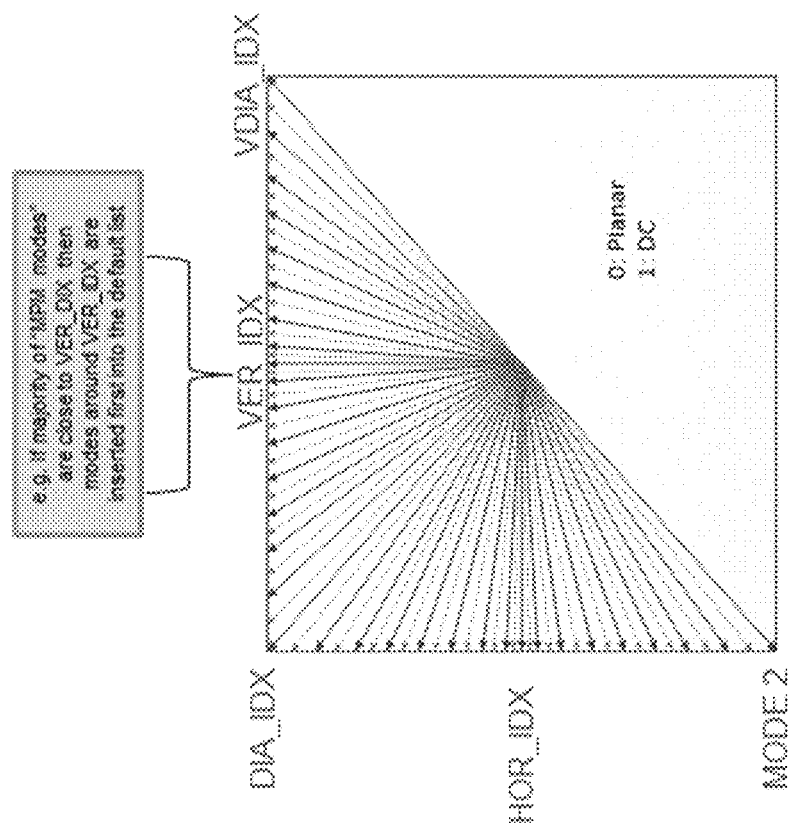
FIG. 7 shows a schematic diagram illustrating an example of the proposed 67 intra prediction modes.
Figure 8:
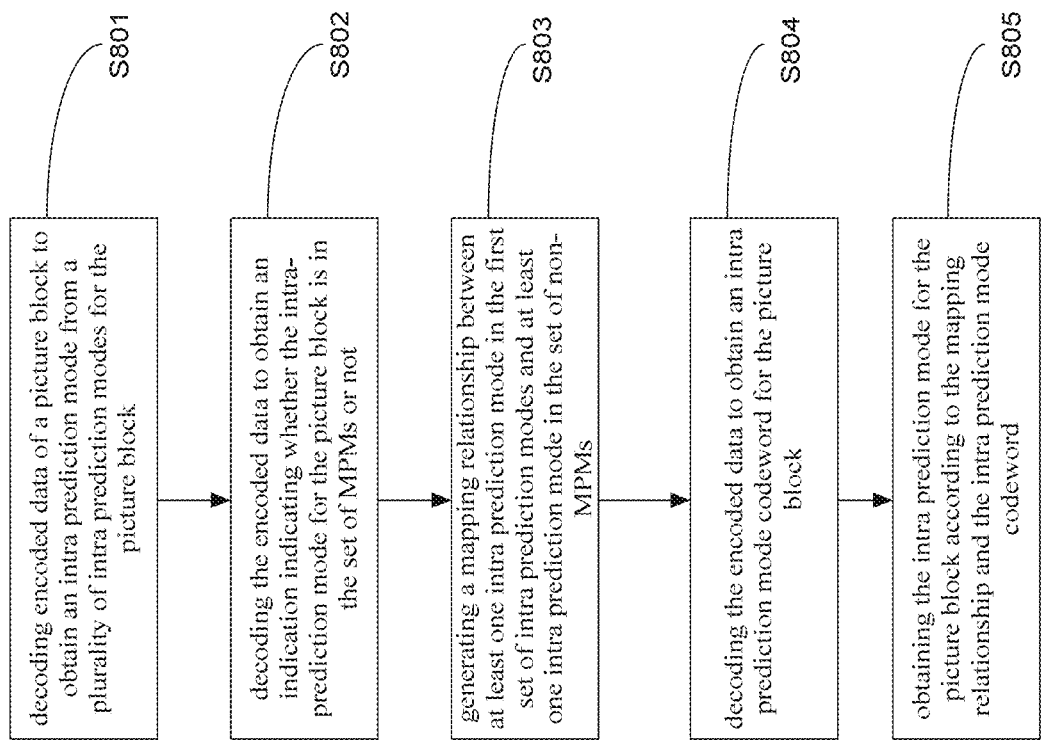
FIG. 8 shows a schematic diagram illustrating an example of a video decoding method according to an embodiment.
Figure 9:
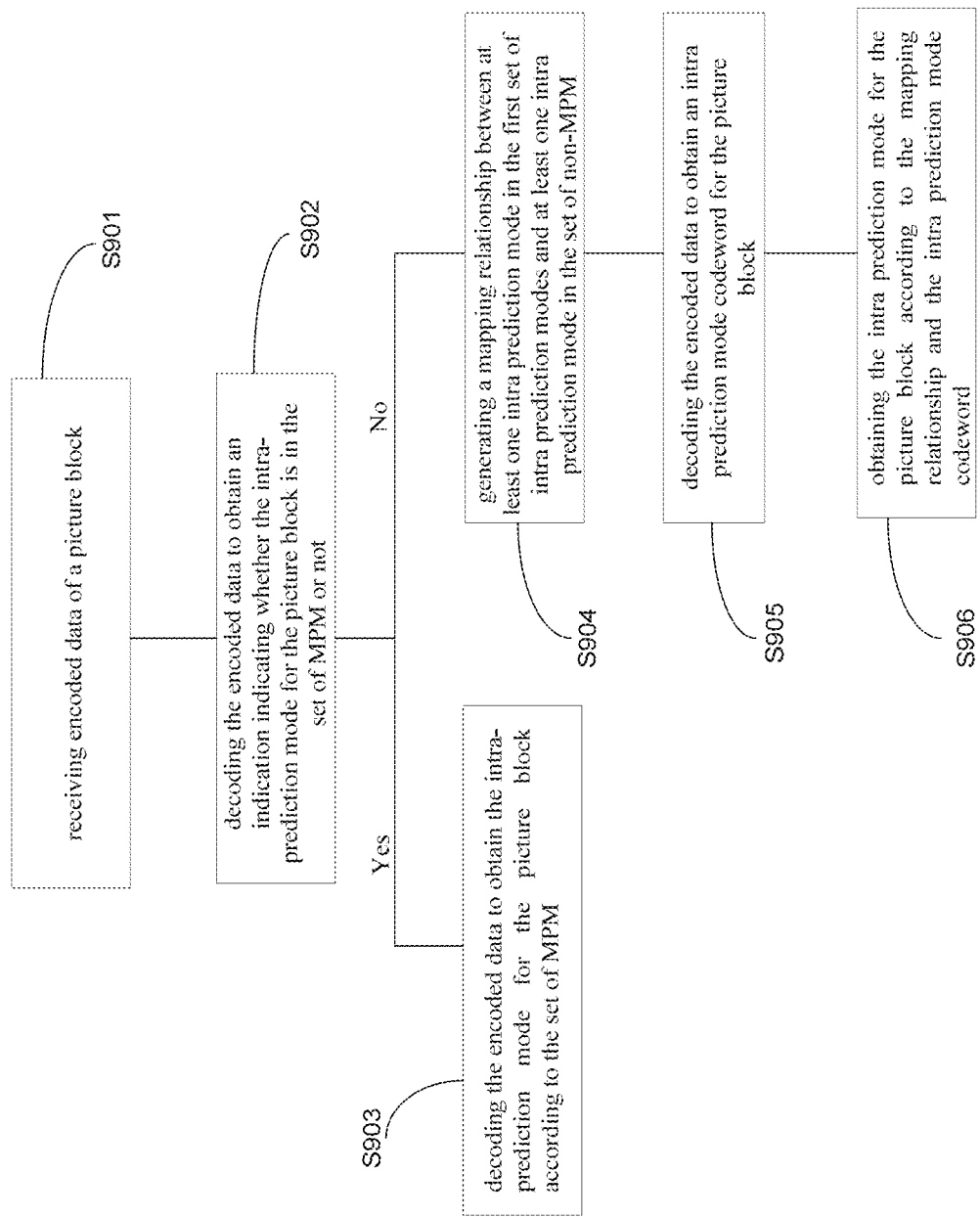
FIG. 9 shows another schematic diagram illustrating an example of a video decoding method according to an embodiment.

FIG. 7 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

Figure 10:
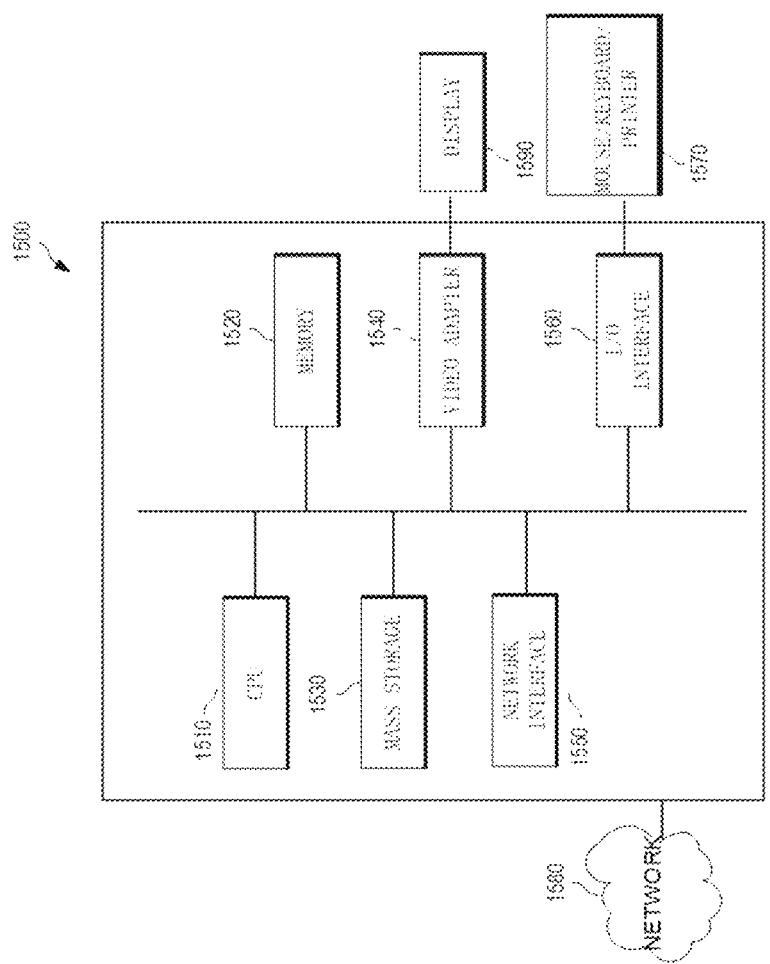
FIG. 10 shows a block diagram of an apparatus according to an embodiment.

FIG. 10 is a schematic diagram of a network device 1300 according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

FIG. 10 is a block diagram of an apparatus 1100 that can be used to implement various embodiments. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1100 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Definitions of Acronyms & Glossary

CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding
Video coding schemes such as H.264/AVC and HEVC are designed along the successful principle of block-based hybrid video coding. Using this principle, a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the present disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The VTM (Versatile Test Model) uses 35 Intra modes whereas the BMS (Benchmark Set) uses 67 Intra modes. To code the 67 intra modes, the current intra mode coding scheme in BMS uses the following method:

To accommodate the increased number of directional Intra modes in BMS, an Intra mode coding method with 6 Most Probable Modes (MPMs) is used. Two major technical aspects are involved.
1) The derivation of 6 MPMs, and
2) entropy coding of 6 MPMs and non-MPMs modes.

In BMS, the modes included into the MPM lists are classified into three groups: Neighbor intra modes, Derived intra modes, and Default intra modes.

Figure 5:
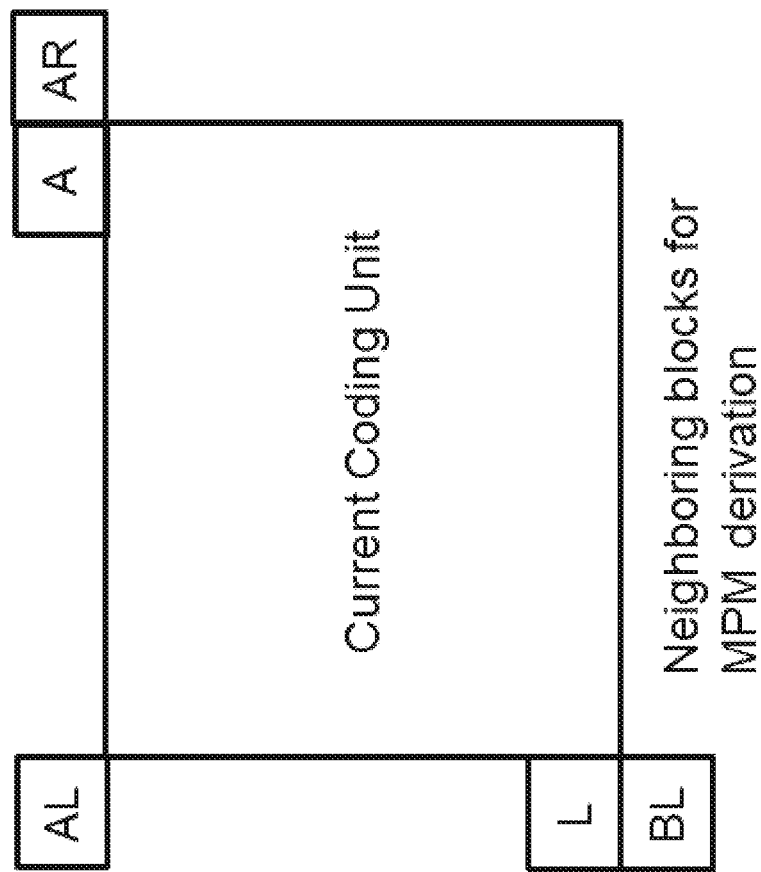
FIG. 5 shows a schematic diagram illustrating neighboring blocks for Most Probable Modes (MPM) derivation according to an embodiment.
Figure 6:
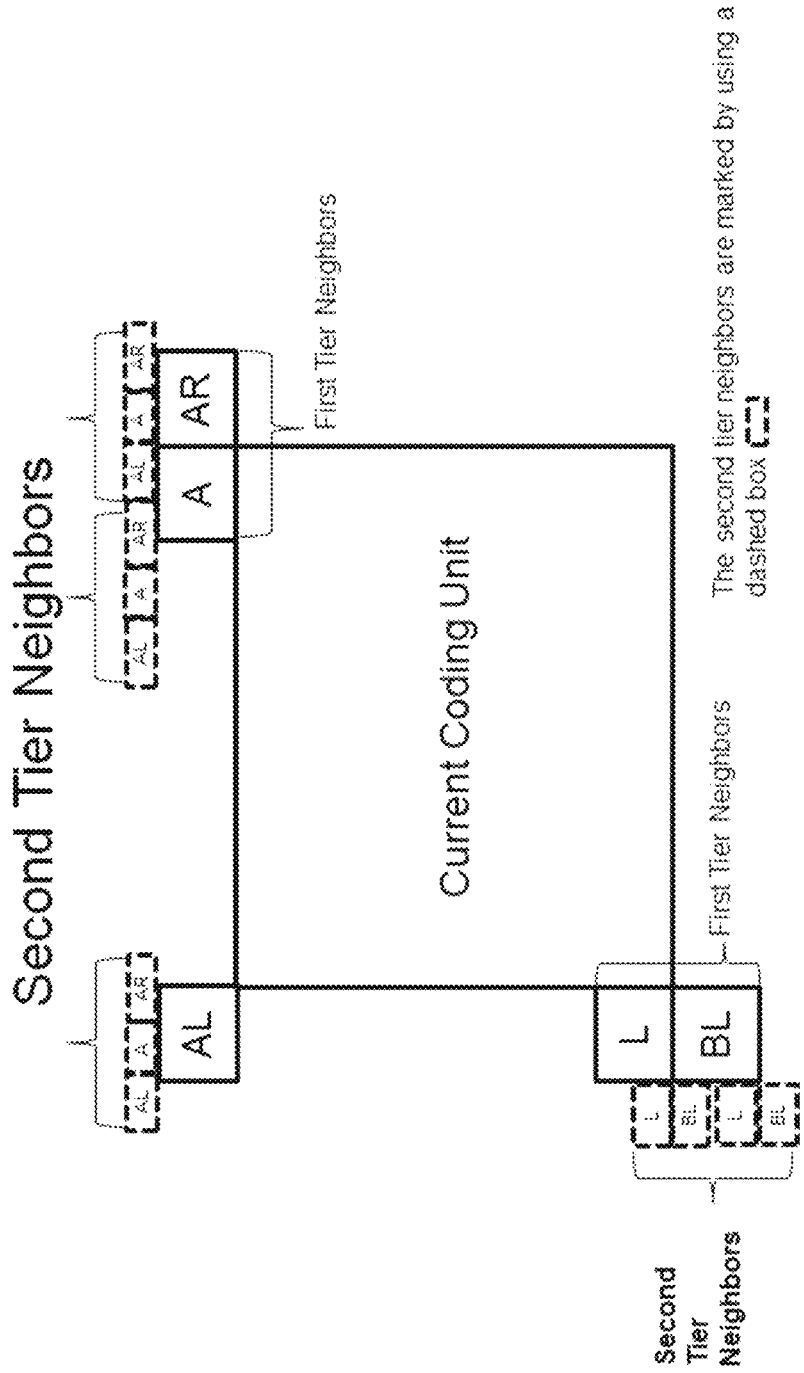
FIG. 6 shows a schematic diagram illustrating second tier neighboring blocks intra modes used for deriving the first three modes in remaining modes list according to an embodiment.

Five neighboring intra prediction modes are used to form the MPM list. Those locations of the 5 neighboring blocks are the same as those used in the merge mode, i.e., left (L), above (A), below left (BL), above right (AR), and above left (AL) as shown in FIG. 5. An initial MPM list is formed by inserting 5 neighbor intra modes, planar, and DC modes into the MPM list. A pruning process is used to remove the duplicated modes so that only unique modes are included into the MPM list. The order in which the initial modes are included is left, above, planar, DC, below left, above right, and above left.

When the MPM list is not full (i.e. has less than 6 MPMs candidates in the list), derived modes are added, those intra modes are obtained by adding −1 or +1 to the angular modes which are already included in the MPM list. Derivation is not applied to non-angular modes, i.e. DC or planar.

Finally, when the MPM list is still not yet complete, the default modes are added in the order of: vertical, horizontal, intra mode 2, and diagonal mode. As a result of this process, a unique list of 6 MPM modes is generated.

For entropy coding of 6 MPMs, a truncated unary binarization of the MPMs can be used. The first three bins are coded with contexts which depend on the MPM mode related to the bin currently being signaled. The MPM mode is classified into one of three categories: (a) whether the mode belongs to horizontal (MPM mode is less than or equal to a diagonal direction), (b) vertical (MPM mode greater than the diagonal direction), or (c) non-angular (DC and planar) class. Accordingly, three contexts are used to signal the MPM index.

The coding of the remaining 61 non-MPMs is done as follows. The 61 non-MPMs are firstly divided into two sets: selected modes set and non-selected modes set. The selected modes set contains 16 modes and the rest (45 modes) are assigned to the non-selected modes set. The mode set that the current mode belongs to is indicated in the bitstream with a flag. Then, the mode from the selected set is signaled with a 4-bit fixed-length code, and the mode from the non-selected set is coded with a truncated binary code. The selected modes set is generated by sub-sampling the total 61 non-MPMs with indexes as follows:

Selected modes set={0, 4, 8, 12, 16, 20 . . . 60},
Non-selected modes set={1, 2, 3, 5, 6, 7, 9, 10 . . . 59}

The summary of the different INTRA mode signaling mechanisms is shown in Table 1.

TABLE 1

Current LUMA Intra mode signaling in BMS

| Intra prediction modes | MPM flag | Selected flag | Bin string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

In another example, an Intra mode coding method with 3 Most Probable Modes (MPMs) is used. In an example, a syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag [x0][y0] is equal to 1, the intra prediction mode is inferred from a neighbouring intra-predicted prediction unit.

Intra prediction for current block (IntraPredModeY[xPb][yPb]) is derived by the following ordered operations:
The neighbouring locations (xNbA, yNbA) and (xNbB, yNbB) are set equal to (xPb−1, yPb) and (xPb, yPb−1), respectively.
For X being replaced by either A or B, the variables candIntraPredModeX are derived as follows:
The availability derivation process for a block is invoked with the location (xCurr, yCurr) set equal to (xPb, yPb) and the neighbouring location (xNbY, yNbY) set equal to (xNbX, yNbX) as inputs, and the output is assigned to availableX.

The candidate intra prediction mode candIntraPredModeX is derived as follows:
When one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yPb−1 is less than ((yPb>>CtbLog2SizeY)<<CtbLog2SizeY).
Otherwise, candIntraPredModeX is set equal to IntraPredModeY[xNbX][yNbX].
The candModeList[x] with x=0 . . . 2 is derived as follows:
When candIntraPredModeB is equal to candIntraPredModeA, the following applies:
When candIntraPredModeA is less than 2 (i.e., equal to INTRA_PLANAR or INTRA_DC),
candModeList[x] with x=0 . . . 2 is derived as follows:
candModeList[0]=INTRA_PLANAR
candModeList[1]=INTRA_DC
candModeList[2]=INTRA_ANGULAR50
Otherwise, candModeList[x] with x=0 . . . 2 is derived as follows:
candModeList[0]=candIntraPredModeA
candModeList[1]=2+((candIntraPredModeA+61) % 64)
candModeList[2]=2+((candIntraPredModeA−1) % 64)
Otherwise (candIntraPredModeB is not equal to candIntraPredModeA), the following applies:
candModeList[0] and candModeList[1] are derived as follows:
candModeList[0]=candIntraPredModeA
candModeList[1]=candIntraPredModeB
When neither of candModeList[0] and candModeList[1] is equal to INTRA_PLANAR,
candModeList[2] is set equal to INTRA_PLANAR,
Otherwise, when neither of candModeList[0] and candModeList[1] is equal to INTRA_DC,
candModeList[2] is set equal to INTRA_DC,
Otherwise, candModeList[2] is set equal to INTRA_ANGULAR50.
IntraPredModeY[xPb][yPb] is derived by applying the following procedure:
When intra_luma_mpm_flag[xPb][yPb] is equal to 1, the IntraPredModeY[xPb][yPb] is set equal to candModeList[intra_luma_mpm_idx[xPb][yPb]].
Otherwise, IntraPredModeY[xPb][yPb] is derived by applying the following ordered operations:
The array candModeList[x], x=0 . . . 2 is modified by the following ordered operations:
When candModeList[0] is greater than candModeList[1], both values are swapped as follows:
(candModeList[0], candModeList[1])=Swap(candModeList[0], candModeList[1])
When candModeList[0] is greater than candModeList[2], both values are swapped as follows:
(candModeList[0], candModeList[2])=Swap(candModeList[0], candModeList[2])
When candModeList[1] is greater than candModeList[2], both values are swapped as follows:
(candModeList[1], candModeList[2])=Swap(candModeList[1], candModeList[2])
IntraPredModeY[xPb][yPb] is derived by the following ordered operations:
IntraPredModeY[xPb][yPb] is set equal to intra_luma_mpm_remainder[xPb][yPb].
For i equal to 0 to 2, inclusive, when IntraPredModeY[xPb][yPb] is greater than or equal to candModeList[i], the value of IntraPredModeY[xPb][yPb] is incremented by one.

In one embodiment, a frame is same as a picture.

In one aspect of the present disclosure, a method for constructing a Most Probable Mode (MPM) list is disclosed, the method comprises:

determining whether a left neighboring block of a current coding block is available or not, when the left neighboring block of the current coding block is available, adding an intra prediction mode of the left neighboring block into an MPM list;

determining whether an above neighboring block of the current coding block is available or not, when the above neighboring block of the current coding block is available, adding an intra prediction mode of the above neighboring block into the MPM list;

when a planar mode is not comprised in the MPM list, adding the planar mode into the MPM list; when a DC mode is not comprised in the MPM list, adding the DC mode into the MPM list.

In one embodiment, when the above neighboring block of the current coding block is available and an intra prediction mode of the above neighboring block is not comprised in the MPM list, adding the intra prediction mode of the above neighboring block into the MPM list.

In one embodiment, when the above neighboring block of the current coding block is available and an intra prediction mode of the above neighboring block is comprised in the MPM list, the "adding" performed or the "adding" process does not change the MPM list.

In one embodiment, when the prediction mode of the left neighboring block is not an intra prediction mode, the left neighboring block of the current coding block is not available.

In one embodiment, when the current coding block is a coding block located in the left-most side of a frame, the left neighboring block of the current coding block is not available.

In one embodiment, wherein parallel processing is supported and the current coding block is a coding block located in the left-most side of a Tile, the left neighboring block of the current coding block is not available.

In one embodiment, wherein parallel processing is not supported and the current coding block is a coding block located in the left-most side of a Tile but not in the left-most side of a frame, the left neighboring block of the current coding block is available.

In one embodiment, wherein parallel processing is supported and the current coding block is a coding block located in the left-most side of a slice, the left neighboring block of the current coding block is not available.

In one embodiment, wherein parallel processing is not supported and the current coding block is a coding block located in the left-most side of a slice but not in the left-most side of a frame, the left neighboring block of the current coding block is available.

In one embodiment, when the prediction mode of the above neighboring block is not an intra prediction mode, the above neighboring block of the current coding block is not available.

In one embodiment, when the current coding block is a coding block located in the top-most side of a frame, the above neighboring block of the current coding block is not available.

In one embodiment, wherein parallel processing is supported and the current coding block is a coding block located in the top-most side of a Tile, the above neighboring block of the current coding block is not available.

In one embodiment, wherein parallel processing is not supported and the current coding block is a coding block located in the top-most side of a Tile but not in the top-most side of a frame, the above neighboring block of the current coding block is available.

In one embodiment, wherein parallel processing is supported and the current coding block is a coding block located in the top-most side of a slice, the above neighboring block of the current coding block is not available.

In one embodiment, wherein parallel processing is not supported and the current coding block is a coding block located in the top-most side of a slice but not in the top-most side of a frame, the above neighboring block of the current coding block is available.

In one embodiment, when line buffer size is constrained and the current coding block is a coding block located in the top-most side of a current CTU, the above neighboring block of the current coding block is not available.

In one embodiment, wherein when the current coding block is a coding block not located in the left-most side of a frame, the left neighboring block of the current coding block is available.

In one embodiment, wherein when the current coding block is a coding block not located in the above-most side of a frame, the above neighboring block of the current coding block is available.

In one embodiment, the method further comprises: when a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one embodiment, a value corresponding to the VER_IDX is 50; a value corresponding to the HOR_IDX is 18; a value corresponding to the VDIA_IDX is 66, and this value may be the largest value in the values corresponding to the angular modes; the value 2 which corresponding to the intra mode 2 may be the smallest value in the values corresponding to the angular modes; a value corresponding to the DIA_IDX is 34.

In one embodiment, when a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one embodiment, wherein the method further comprises: when a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one embodiment, wherein the method further comprises: when the left neighboring block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a vertical diagonal mode (VDIA_IDX), a diagonal mode (DIA_IDX) or an intra mode 2 (2).

In one embodiment, wherein the method further comprises: when the left neighboring block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In one embodiment, wherein the method further comprises: when a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset −4 or an intra prediction mode corresponding to VER_IDX with an offset 4.

In one embodiment, wherein an intra prediction mode corresponding to VER_IDX with an offset −4 is using the value corresponding to the VER_IDX to add the offset −4 and obtain the value of the corresponded intra prediction mode, for example, as the value of VER_IDX is 50, an intra prediction mode corresponding to VER_IDX with an offset −4 is the intra prediction mode 46, an intra prediction mode corresponding to VER_IDX with an offset 4 is the intra prediction mode 54. The other examples with offset has similar process as this example.

Note that when performing −1 or +1 or other offset values, it might involve a wrap up and wrap down operation, for example, as the value of intra mode (2) is 2 (the smallest value in the values corresponding to the angular modes), then intra mode (2)−1 would be 66 (wrap up case), or as the value of VDIA_IDX is 66 (the biggest value in the values corresponding to the angular modes), then VDIA_IDX+1 would be 2 (wrap down case).

In one embodiment, wherein the method further comprises: when a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

In one embodiment, wherein the method further comprises: when a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset 4 or an intra prediction mode corresponding to VER_IDX with an offset −4.

In one embodiment, wherein the method further comprises: when a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset 4 or an intra prediction mode corresponding to VER_IDX with an offset −4 according to the aforementioned order to the MPM list, when the intra-prediction mode is not comprised in the MPM list, until the quantity of prediction modes is equal to the threshold.

In one embodiment, wherein the method further comprises: when the left neighboring block of the current coding block is not available and a quantity of intra prediction modes in the MPM list is less than a threshold,
checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises one of the following intra prediction modes sets:
a vertical mode (VER_IDX) (as first intra prediction mode), a vertical diagonal mode (VDIA_IDX), an intra prediction mode corresponding to VER_IDX with an offset −1, and an intra prediction mode corresponding to VER_IDX with an offset 1; or
a vertical mode (VER_IDX) (as first intra prediction mode), a vertical diagonal mode (VDIA_IDX), an intra prediction mode corresponding to VER_IDX with an offset −4, and an intra prediction mode corresponding to VER_IDX with an offset 4; or
a vertical mode (VER_IDX) (as first intra prediction mode), a vertical diagonal mode (VDIA_IDX), an intra prediction mode corresponding to VDIA_IDX with an offset −4, and an intra prediction mode corresponding to VER_IDX with an offset −1; or
a vertical mode (VER_IDX) (as first intra prediction mode), a vertical diagonal mode (VDIA_IDX), an intra prediction mode corresponding to VDIA_IDX with an offset −4, and an intra prediction mode corresponding to VER_IDX with an offset +1; or
a vertical mode (VER_IDX) (as first intra prediction mode), a vertical diagonal mode (VDIA_IDX), an intra prediction mode corresponding to VDIA_IDX with an offset −1, and an intra prediction mode corresponding to VER_IDX with an offset −1; or
a vertical mode (VER_IDX) (as first intra prediction mode), a vertical diagonal mode (VDIA_IDX), an intra prediction mode corresponding to VDIA_IDX with an offset −1, and an intra prediction mode corresponding to VER_IDX with an offset 1; or
a vertical mode (VER_IDX) (as first intra prediction mode), a vertical diagonal mode (VDIA_IDX), an intra prediction mode corresponding to VER_IDX with an offset −1, and an intra prediction mode corresponding to VDIA_IDX with an offset −4; or
a vertical mode (VER_IDX) (as first intra prediction mode), a vertical diagonal mode (VDIA_IDX), an intra prediction mode corresponding to VER_IDX with an offset 1, and an intra prediction mode corresponding to VDI-A_IDX with an offset −4; or a vertical mode (VER_IDX) (as first intra prediction mode), a vertical diagonal mode (VDIA_IDX), an intra prediction mode corresponding to VER_IDX with an offset −1, and an intra prediction mode corresponding to VDI-A_IDX with an offset −1; or a vertical mode (VER_IDX) (as first intra prediction mode), a vertical diagonal mode (VDIA_IDX), an intra prediction mode corresponding to VER_IDX with an offset 1, and an intra prediction mode corresponding to VDI-A_IDX with an offset −1.

In one embodiment, wherein the method further comprises: when the left neighboring block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold;

wherein the set of intra-prediction modes comprises one of the following intra prediction modes sets:

a vertical mode (VER_IDX), a vertical diagonal mode (VDIA_IDX), an intra prediction mode corresponding to VER_IDX with an offset −1, and an intra prediction mode corresponding to VER_IDX with an offset 1; or a vertical mode (VER_IDX), a vertical diagonal mode (VDIA_IDX), an intra prediction mode corresponding to VER_IDX with an offset −4, and an intra prediction mode corresponding to VER_IDX with an offset 4; or a vertical mode (VER_IDX), a vertical diagonal mode (VDIA_IDX), an intra prediction mode corresponding to VDIA_IDX with an offset −4, and an intra prediction mode corresponding to VER_IDX with an offset −1; or a vertical mode (VER_IDX), a vertical diagonal mode (VDIA_IDX), an intra prediction mode corresponding to VDIA_IDX with an offset −4, and an intra prediction mode corresponding to VER_IDX with an offset +1; or a vertical mode (VER_IDX), a vertical diagonal mode (VDIA_IDX), an intra prediction mode corresponding to VDIA_IDX with an offset −1, and an intra prediction mode corresponding to VER_IDX with an offset −1; or a vertical mode (VER_IDX), a vertical diagonal mode (VDIA_IDX), an intra prediction mode corresponding to VDIA_IDX with an offset −1, and an intra prediction mode corresponding to VER_IDX with an offset 1; or a vertical mode (VER_IDX), a vertical diagonal mode (VDIA_IDX), an intra prediction mode corresponding to VER_IDX with an offset −1, and an intra prediction mode corresponding to VDIA_IDX with an offset −4; or a vertical mode (VER_IDX), a vertical diagonal mode (VDIA_IDX), an intra prediction mode corresponding to VER_IDX with an offset 1, and an intra prediction mode corresponding to VDIA_IDX with an offset −4; or a vertical mode (VER_IDX), a vertical diagonal mode (VDIA_IDX), an intra prediction mode corresponding to VER_IDX with an offset −1, and an intra prediction mode corresponding to VDIA_IDX with an offset −1; or a vertical mode (VER_IDX), a vertical diagonal mode (VDIA_IDX), an intra prediction mode corresponding to VER_IDX with an offset 1, and an intra prediction mode corresponding to VDIA_IDX with an offset −1.

In one embodiment, wherein the method further comprises: when a quantity of intra prediction modes in the MPM list is less than a threshold, the above neighboring block of the current coding block is not available, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a horizontal mode (HOR_IDX) (as first intra prediction mode), an intra mode 2 (2), a diagonal mode (DIA_IDX) or a vertical diagonal mode (VDIA_IDX).

In one embodiment, wherein the method further comprises: when a quantity of intra prediction modes in the MPM list is less than a threshold, the above neighboring block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In one embodiment, wherein the method further comprises: when a quantity of intra prediction modes in the MPM list is less than a threshold, the left neighboring block of the current coding block is available and the above neighboring block of the current coding block is available, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one embodiment, wherein the method further comprises: when a quantity of intra prediction modes in the MPM list is less than a threshold, the left neighboring block of the current coding block is available and the above neighboring block of the current coding block is available, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one embodiment, wherein the method further comprises: when a quantity of intra prediction modes in the MPM list is less than a threshold, the above neighboring block of the current coding block is not available, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a horizontal mode (HOR_IDX) (as first intra prediction mode), an intra mode 2 (2), a diagonal mode (DIA_IDX) or a vertical diagonal mode (VDIA_IDX).

In one embodiment, wherein the method further comprises: when a quantity of intra prediction modes in the MPM list is less than a threshold, the above neighboring block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In one embodiment, wherein the method further comprises: when a quantity of intra prediction modes in the MPM list is less than a threshold, the left neighboring block of the current coding block is available and the above neighboring block of the current coding block is available, checking whether a first intra prediction mode of a set of intra-prediction modes is comprised in the MPM list, and adding the first intra-prediction mode to the MPM list when the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset −4 or an intra prediction mode corresponding to VER_IDX with an offset 4.

In one embodiment, wherein the method further comprises: when a quantity of intra prediction modes in the MPM list is less than a threshold, the left neighboring block of the current coding block is available and the above neighboring block of the current coding block is available, adding iteratively an intra-prediction mode of a set of intra-prediction modes comprises a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

In one embodiment, wherein the method further comprises: when the above neighboring block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises one of the following intra prediction modes sets:

a horizontal mode (HOR_IDX) (as first intra prediction mode), an intra mode 2 (2), an intra prediction mode corresponding to HOR_IDX with an offset −1, and an intra prediction mode corresponding to HOR_IDX with an offset 1; or a horizontal mode (HOR_IDX) (as first intra prediction mode), an intra mode 2 (2), an intra prediction mode corresponding to HOR_IDX with an offset −4, and HOR_IDX add an offset 4; or a horizontal mode (HOR_IDX) (as first intra prediction mode), an intra mode 2 (2), an intra prediction mode corresponding to an intra mode 2 (2) with an offset 4, and an intra prediction mode corresponding to HOR_IDX with an offset −1; or a horizontal mode (HOR_IDX) (as first intra prediction mode), an intra mode 2 (2), an intra prediction mode corresponding to an intra mode 2 (2) with an offset 4, and an intra prediction mode corresponding to HOR_IDX with an offset 1; or a horizontal mode (HOR_IDX) (as first intra prediction mode), an intra mode 2 (2), an intra prediction mode corresponding to an intra mode 2 (2) with an offset 1, and an intra prediction mode corresponding to HOR_IDX with an offset −1; or a horizontal mode (HOR_IDX) (as first intra prediction mode), an intra mode 2 (2), an intra prediction mode corresponding to an intra mode 2 (2) with an offset 1, and an intra prediction mode corresponding to HOR_IDX with an offset 1; or a horizontal mode (HOR_IDX) (as first intra prediction mode), an intra mode 2 (2), an intra prediction mode corresponding to HOR_IDX with an offset −1, and an intra prediction mode corresponding to an intra mode 2 (2) with an offset 4; or a horizontal mode (HOR_IDX) (as first intra prediction mode), an intra mode 2 (2), an intra prediction mode corresponding to HOR_IDX with an offset 1, and an intra prediction mode corresponding to an intra mode 2 (2) with an offset 4; or a horizontal mode (HOR_IDX) (as first intra prediction mode), an intra mode 2 (2), an intra prediction mode corresponding to HOR_IDX with an offset −1, and an intra prediction mode corresponding to an intra mode 2 (2) with an offset 1; or a horizontal mode (HOR_IDX) (as first intra prediction mode), an intra mode 2 (2), an intra prediction mode corresponding to HOR_IDX with an offset 1, and an intra prediction mode corresponding to an intra mode 2 (2) with an offset 1.

In one embodiment, wherein the method further comprises: when the above neighboring block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold; wherein the set of intra-prediction modes comprising one of the following intra prediction modes sets:

a horizontal mode (HOR_IDX), an intra mode 2 (2), an intra prediction mode corresponding to HOR_IDX with an offset −1, and an intra prediction mode corresponding to HOR_IDX with an offset 1; or a horizontal mode (HOR_IDX), an intra mode 2 (2), an intra prediction mode corresponding to HOR_IDX with an offset −4, and HOR_IDX add an offset 4; or a horizontal mode (HOR_IDX), an intra mode 2 (2), an intra prediction mode corresponding to an intra mode 2 (2) with an offset 4, and an intra prediction mode corresponding to HOR_IDX with an offset −1; or a horizontal mode (HOR_IDX), an intra mode 2 (2), an intra prediction mode corresponding to an intra mode 2 (2) with an offset 4, and an intra prediction mode corresponding to HOR_IDX with an offset 1; or a horizontal mode (HOR_IDX), an intra mode 2 (2), an intra prediction mode corresponding to an intra mode 2 (2) with an offset 1, and an intra prediction mode corresponding to HOR_IDX with an offset −1; or a horizontal mode (HOR_IDX), an intra mode 2 (2), an intra prediction mode corresponding to an intra mode 2 (2) with an offset 1, and an intra prediction mode corresponding to HOR_IDX with an offset 1; or a horizontal mode (HOR_IDX), an intra mode 2 (2), an intra prediction mode corresponding to HOR_IDX with an offset −1, and an intra prediction mode corresponding to an intra mode 2 (2) with an offset 4; or a horizontal mode (HOR_IDX), an intra mode 2 (2), an intra prediction mode corresponding to HOR_IDX with an offset 1, and an intra prediction mode corresponding to an intra mode 2 (2) with an offset 4; or a horizontal mode (HOR_IDX), an intra mode 2 (2), an intra prediction mode corresponding to HOR_IDX with an offset −1, and an intra prediction mode corresponding to an intra mode 2 (2) with an offset 1; or a horizontal mode (HOR_IDX), an intra mode 2 (2), an intra prediction mode corresponding to HOR_IDX with an offset 1, and an intra prediction mode corresponding to an intra mode 2 (2) with an offset 1.

In one embodiment, the method further comprises: when a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one embodiment, the method further comprises: when the left neighboring block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprises a vertical mode (VER_IDX), a vertical diagonal mode (VDIA_IDX), a diagonal mode (DIA_IDX) or an intra mode 2 (2).

In one embodiment, the method further comprises: when the left neighboring block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In one embodiment, it could be understood that adding an intra prediction mode into the MPM list is adding a value corresponding to the intra prediction mode into the MPM list.

In one embodiment, the threshold is 6.

In one aspect of the present application, an encoder comprising processing circuitry for carrying out the above methods.

In one aspect of the present application, a decoder comprising processing circuitry for carrying out the above methods.

In one aspect of the present application, a computer program product comprising a program code for performing the above methods.

In one aspect of the present application, a decoder for construct a Most Probable Mode, MPM, list, comprising: one or more processors; and a non-transitory computer-readable storage medium coupled to the processors and storing programming for execution by the processors, wherein the programming, when executed by the processors, configures the decoder to carry out the above methods.

In one aspect of the present application, an encoder for construct a Most Probable Mode, MPM, list, comprising: one or more processors; and a non-transitory computer-readable storage medium coupled to the processors and storing programming for execution by the processors, wherein the programming, when executed by the processors, configures the encoder to carry out the above methods.

In an example,

Operation one: determining whether a left neighboring block of a current coding block is available or not.

When the left neighboring block of the current coding block is available, adding an intra prediction mode of the left neighboring block into an MPM list. The MPM list may be an empty list, when the left neighboring block of the current coding block is available, an intra prediction mode of the left neighboring block is added into the MPM list, then the MPM list includes one intra prediction mode; and when the left neighboring block of the current coding block is not available, the MPM list may be an empty list after operation one.

Operation two: determining whether an above neighboring block of the current coding block is available or not.

When the above neighboring block of the current coding block is available, adding an intra prediction mode of the above neighboring block into the MPM list. The MPM list may include the intra prediction mode of the left neighboring block or may be an empty list.

When the above neighboring block of the current coding block is available and the MPM list includes the intra prediction mode of the left neighboring block, it is further to determine whether the intra prediction mode of the above neighboring block is same as the intra prediction mode of the left neighboring block, when they are same, the result of the operation "adding an intra prediction mode of the above neighboring block into the MPM list" does not change the quantity of intra prediction mode in the MPM list, the MPM list only includes one intra prediction mode; when the intra prediction mode of the above neighboring block is not same as the intra prediction mode of the left neighboring block, adding the intra prediction mode of the above neighboring block into the MPM list and then the MPM list includes two intra prediction modes.

When the above neighboring block of the current coding block is available and the MPM list still is an empty list, adding the intra prediction mode of the above neighboring block into the MPM list, the MPM list includes only one intra prediction mode.

When the above neighboring block of the current coding block is not available and the MPM list includes the intra prediction mode of the left neighboring block, the MPM list will still only includes the intra prediction mode of the left neighboring block.

When the above neighboring block of the current coding block is not available and the MPM list still is an empty list, the MPM list will still be an empty list.

Operation three: when a planar mode is not in the MPM list, adding the planar mode into the MPM list.

When after operation two, the MPM list does not include a planar mode, then adding the planar mode into the MPM list.

When both the intra prediction mode of the left neighboring block and the intra prediction mode of the above neighboring block are not available, or the available intra prediction mode is not the planar mode, the MPM list does not include a planar mode.

When a planar mode is in the MPM list, go to operation four.

Operation four: when a DC mode is not in the MPM list, adding the DC mode into the MPM list.

When after operation two or operation three, the MPM list does not include a DC mode, then adding the DC mode into the MPM list.

When both the intra prediction mode of the left neighboring block and the intra prediction mode of the above neighboring block are not available, or the available intra prediction mode is not the DC mode, the MPM list does not include a DC mode.

When a DC mode is in the MPM list, go to the following operations or finish constructing the MPM list.

In one embodiment, in some operations, the process to add a prediction mode into the MPM list need to make sure no duplicated prediction modes in the MPM list. Hence, when an intra prediction mode needs to be added into the MPM list is same as one intra prediction mode in the MPM list, the "adding" process does not change the MPM list or the "adding" process is not performed.

In one embodiment, after operation 4, only when angular mode exist, then do angular-1, angular+1.

In an example, when a quantity of intra prediction modes in the MPM list is six. After operation four, there are three cases regarding the length of MPM:

Case 1: MPM length is 2: →both L and A not angular (>DC) (only planar and DC) or not available→use all four default modes.

Case 2: MPM length is 3: →one of L and A is angular, or they are same angular→use one default mode.

Case 3: MPM length is 4: →both L and A is angular and they are different→no default mode is used, as at least one of L−1, L+1, will be added. When one of them is a duplication of above (diff(L−A)=1), then at least one of A−1 and A+1 will be further inserted.

In one embodiment, the method further comprises: when the left neighboring block of the current coding block is available and the intra prediction mode of the left neighboring block is an angular mode, adding an offset to the prediction mode of the left neighboring block to obtain a new prediction mode, when the new prediction mode is not in the MPM list, adding the new prediction mode into the MPM list.

In another example, the MPM list includes six intra prediction modes, as the above four operations only could obtain four intra prediction modes in largest case. The method further comprises:

Operation five: when the left neighboring block of the current coding block is available and the intra prediction mode of the left neighboring block is an angular mode, adding an offset to the prediction mode of the left neighboring block to obtain a new prediction mode, and when the new prediction mode is not in the MPM list, adding the new prediction mode into the MPM list.

For example, when the left neighboring block of the current coding block is angular mode 27 (a value corresponding to this angular intra prediction mode is 27), and the MPM list after the above four operations is (27, 15, 0, 1). Adding an offset to the prediction mode of the left neighboring block to obtain a new prediction mode, when the new prediction mode is not in the MPM list, adding the new prediction mode into the MPM list. In an example, the offset is −1, so the new prediction mode is 26 and an updated MPM list is (27, 15, 0, 1, 26). In another example, the offset is 1, so the new prediction mode is 28 and an updated MPM list is (27, 15, 0, 1, 28). In another example, operation five could adding two offsets to the intra prediction mode of the left neighboring block, first add −1 and then add 1 or first add 1 and then add −1, so the updated MPM list may be (27, 15, 0, 1, 26, 28) or (27, 15, 0, 1, 28, 26).

After operation five, check whether the MPM list is full (When a quantity of intra prediction modes in the MPM list is equal to a threshold, for example, the threshold is 6, then the MPM list is full. When a quantity of intra prediction modes in the MPM list is less than a threshold, then the MPM list is not full). When the MPM list is full, finish constructing the MPM list; when the MPM list is not full, go to the following operations.

And when the left neighboring block of the current coding block is not available, operation five is not performed and go to following operations.

Note that when adding an offset (for example, −1 or +1) to an angular prediction mode, it might involve a wrap up and wrap down operation, for example, when an angular prediction mode angularLeft is 2, then angularLeft-1 would be 66 (wrap up case), or when angularLeft is 66, then angularLeft+1 would be 2 (wrap down case).

In one embodiment, the method further comprises: when the above neighboring block of the current coding block is available and the intra prediction mode of the above neighboring block is an angular mode, adding an offset to the prediction mode of the above neighboring block to obtain an above-offset prediction mode, when the above-offset prediction mode is not in the MPM list, adding the above-offset prediction mode into the MPM list.

In an example, the method further comprises:

Operation six: when the above neighboring block of the current coding block is available and the intra prediction mode of the above neighboring block is an angular mode, adding an offset to the prediction mode of the above neighboring block to obtain an above-offset prediction mode, and when the above-offset prediction mode is not in the MPM list, adding the new prediction mode into the MPM list.

For example, when the above neighboring block of the current coding block is angular mode 26 (a value corresponding to this angular intra prediction mode is 26), and the MPM list after the above five operations is (27, 26, 0, 1, 28). Adding an offset to the prediction mode of the left neighboring block to obtain an above-offset prediction mode, when the above-offset prediction mode is not in the MPM list, adding the above-offset prediction mode into the MPM list. In an example, the offset is −1, so the above-offset prediction mode is 25 and an updated MPM list is (27, 26, 0, 1, 28, 25). In another example, the offset is 1, so the above-offset prediction mode is 27 and the insertion of above-offset mode 27 is blocked, since mode 27 has been inserted. In another example, operation six could add two offsets to the intra prediction mode of the above neighboring block, first add −1 and then add 1 or first add 1 and then add −1, when the MPM list is still not full after added one offset.

And when the above neighboring block of the current coding block is not available, operation six is not performed and go to following operations. After operation six, check whether the MPM list is full (a quantity of intra prediction modes in the MPM list is equal to 6). When the MPM list is full, finish construct the MPM list; when the MPM list is not full (a quantity of intra prediction modes in the MPM list is less than 6), go to the following operations.

In one embodiment, the method further comprises:

when a quantity of intra prediction modes in the MPM list is less than a threshold (for example, the threshold is 6), using a default list to construct the MPM list. In an example, when a quantity of intra prediction modes in the MPM list is less than a threshold, a default list comprises a vertical mode (VER_IDX), a horizontal mode (HOR_IDX), an intra mode 2 (2), a vertical diagonal mode (VDIA_IDX) or a diagonal mode (DIA_IDX).

In an example, when a quantity of intra prediction modes in the MPM list is less than a threshold, a default list comprises a vertical mode (VER_IDX), a horizontal mode (HOR_IDX), a VER_IDX add an offset −4 or a VER_IDX add an offset 4.

In an example, when a quantity of intra prediction modes in the MPM list is less than a threshold, a default list comprises a vertical mode (VER_IDX), a horizontal mode (HOR_IDX), a VER_IDX add an offset 4 or a VER_IDX add an offset −4.

In an example, when the left neighboring block of the current coding block is not available and a quantity of intra prediction modes in the MPM list is less than a threshold, a default list comprises:
vertical mode (VER_IDX), vertical diagonal mode (VDIA_IDX), diagonal mode (DIA_IDX) or intra mode 2 (2); or
vertical mode (VER_IDX), vertical diagonal mode (VDIA_IDX), VER_IDX add an offset −1, and VER_IDX add an offset 1; or
vertical modes (VER_IDX), vertical diagonal mode (VDIA_IDX), VER_IDX add an offset −4, and VER_IDX add an offset 4; or
vertical modes (VER_IDX), vertical diagonal mode (VDIA_IDX), VDIA_IDX add an offset −4, and VER_IDX add an offset −1; or
vertical modes (VER_IDX), vertical diagonal mode (VDIA_IDX), VDIA_IDX add an offset −4, and VER_IDX add an offset +1; or
vertical modes (VER_IDX), vertical diagonal mode (VDIA_IDX), VDIA_IDX add an offset −1, and VER_IDX add an offset −1; or
vertical modes (VER_IDX), vertical diagonal mode (VDIA_IDX), VDIA_IDX add an offset −1, and VER_IDX add an offset 1; or
vertical modes (VER_IDX), vertical diagonal mode (VDIA_IDX), VER_IDX add an offset −1, and VDIA_IDX add an offset −4; or
vertical modes (VER_IDX), vertical diagonal mode (VDIA_IDX), VER_IDX add an offset 1, and VDIA_IDX add an offset −4; or
vertical modes (VER_IDX), vertical diagonal mode (VDIA_IDX), VER_IDX add an offset −1, and VDIA_IDX add an offset −1; or
vertical modes (VER_IDX), vertical diagonal mode (VDIA_IDX), VER_IDX add an offset 1, and VDIA_IDX add an offset −1.

In an example, when a quantity of intra prediction modes in the MPM list is less than a threshold, the above neighboring block of the current coding block is not available, a default list comprises:
a horizontal mode (HOR_IDX), an intra mode 2 (2), a diagonal mode (DIA_IDX) or a vertical diagonal mode (VDIA_IDX).

In an example, when a quantity of intra prediction modes in the MPM list is less than a threshold, the left neighboring block of the current coding block is available and the above neighboring block of the current coding block is available, a default list comprises:
a vertical mode (VER_IDX), a horizontal mode (HOR_IDX), an intra mode 2 (2), a vertical diagonal mode (VDIA_IDX) or a diagonal mode (DIA_IDX); or
a vertical mode (VER_IDX), a horizontal mode (HOR_IDX), a VER_IDX add an offset −4 or a VER_IDX add an offset 4; or
a vertical mode (VER_IDX), a horizontal mode (HOR_IDX), a VER_IDX add an offset 4 or a VER_IDX add an offset −4.

In an example, when a quantity of intra prediction modes in the MPM list is less than a threshold and the above neighboring block of the current coding block is not available, a default list comprises:
horizontal mode (HOR_IDX), an intra mode 2 (2), HOR_IDX add an offset −1, and HOR_IDX add an offset 1; or
horizontal modes (HOR_IDX), an intra mode 2 (2), HOR_IDX add an offset −4, and HOR_IDX add an offset 4; or
horizontal modes (HOR_IDX), an intra mode 2 (2), an intra mode 2 (2) add an offset 4, and HOR_IDX add an offset −1; or
horizontal modes (HOR_IDX), an intra mode 2 (2), an intra mode 2 (2) add an offset 4, and HOR_IDX add an offset 1; or
horizontal modes (HOR_IDX), an intra mode 2 (2), an intra mode 2 (2) add an offset 1, and HOR_IDX add an offset −1; or
horizontal modes (HOR_IDX), an intra mode 2 (2), an intra mode 2 (2) add an offset 1, and HOR_IDX add an offset 1; or
horizontal modes (HOR_IDX), an intra mode 2 (2), HOR_IDX add an offset −1, and an intra mode 2 (2) add an offset 4; or
horizontal modes (HOR_IDX), an intra mode 2 (2), HOR_IDX add an offset 1, and an intra mode 2 (2) add an offset 4; or
horizontal modes (HOR_IDX), an intra mode 2 (2), HOR_IDX add an offset −1, and an intra mode 2 (2) add an offset 1; or
horizontal modes (HOR_IDX), an intra mode 2 (2), HOR_IDX add an offset 1, and an intra mode 2 (2) add an offset 1.

In one embodiment, when a left neighboring block of the current coding block is not available, an above neighboring block of the current coding block may be available or may not be available.

In one embodiment, when an above neighboring block of the current coding block is not available, a left neighboring block of the current coding block may be available or may not be available.

In one embodiment, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list.

In one embodiment, the method further comprises: when a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX).

In one embodiment, the method further comprises: when a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In an example, after operation six, when the MPM list is still not full (a quantity of intra prediction modes in the MPM list less than a threshold), adding an intra prediction mode in a default mode list orderly into the MPM list when this mode or these modes are not in the MPM list, and iterate this operation until the MPM list is full.

Operation seven: adding a vertical mode (VER_IDX), a horizontal mode (HOR_IDX), an intra mode 2 (2), a vertical diagonal mode (VDIA_IDX) or a diagonal mode (DIA_IDX) into the MPM list.

For example, when a vertical mode is not in the MPM list and the MPM list is not full, add the vertical mode into the MPM list, when the MPM list is full after add the vertical mode, finish constructing the MPM list.

In one embodiment, when the MPM list is still not full after adding the vertical mode, check whether a horizontal mode is in the MPM list. When the horizontal mode is in the MPM list, and check whether an intra mode 2 is in the MPM list; when the horizontal mode is not in the MPM list, add the horizontal mode into the MPM list. Iterate this operation until the MPM list is full.

In one embodiment, in Operation seven, with the default modes lists, every insertion of default mode to the MPM list shall make sure no duplicated mode is inserted. When the insertion is successful, another check is performed to detect whether the MPM is full. If so, then the MPM construction process terminates; otherwise, continue insertion with other default mode with the specified order.

In one embodiment, the method further comprises: when the left neighboring block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprising a vertical mode (VER_IDX), a vertical diagonal mode (VDIA_IDX), a diagonal mode (DIA_IDX) or an intra mode 2 (2).

In one embodiment, the method further comprises:

when the left neighboring block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In an example, after operation six, when the MPM list is still not full and the left neighboring block of the current coding block is not available, adding intra prediction mode in a default mode list orderly into the MPM list when this mode or these modes are not in the MPM list, iterate this operation until the MPM list is full.

Operation seven: adding a vertical mode (VER_IDX), a vertical diagonal mode (VDIA_IDX), a diagonal mode (DIA_IDX) or an intra mode 2 (2) into the MPM list.

For example, when a vertical mode is not in the MPM list and the MPM list is not full, add the vertical mode into the MPM list, when the MPM list is full after adding the vertical mode, finish construction of the MPM list.

In one embodiment, when the MPM list is still not full after adding the vertical mode, check whether a vertical diagonal mode is in the MPM list. When the vertical diagonal mode is in the MPM list, check whether a diagonal mode is in the MPM list; when the diagonal mode is not in the MPM list, add the diagonal mode into the MPM list. Iterate this operation until the MPM list is full.

In one embodiment, the method further comprises:

when a quantity of intra prediction modes in the MPM list is less than a threshold, the above neighboring block of the current coding block is not available, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprising a horizontal mode (HOR_IDX), an intra mode 2 (2), a diagonal mode (DIA_IDX) or a vertical diagonal mode (VDIA_IDX).

In one embodiment, the method further comprises: when a quantity of intra prediction modes in the MPM list is less than a threshold, the above neighboring block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In an example, after operation six, when the MPM list is still not full, the above neighboring block of the current coding block is not available, adding intra prediction mode in a default mode list orderly into the MPM list when this mode or these modes are not in the MPM list, iterate this operation until the MPM list is full.

Operation seven: adding a horizontal mode (HOR_IDX), an intra mode 2 (2), a diagonal mode (DIA_IDX) or a vertical diagonal mode (VDIA_IDX) into the MPM list.

For example, when a horizontal mode is not in the MPM list and the MPM list is not full, add the horizontal mode into the MPM list, when the MPM list is full after adding the horizontal mode, finish construction of the MPM list.

And when the MPM list is still not full after adding the horizontal mode, check whether an intra mode 2 is in the MPM list. When the intra mode 2 is in the MPM list, check whether a diagonal mode is in the MPM list; when the diagonal mode is not in the MPM list, add the diagonal mode into the MPM list. Iterate this operation until the MPM list is full.

In one embodiment, the method further comprises: when a quantity of intra prediction modes in the MPM list is less than a threshold, the left neighboring block of the current coding block is available and the above neighboring block of the current coding block is available, checking whether a first intra prediction mode of a set of intra-prediction modes is comprised in the MPM list, and add the first intra-prediction mode to the MPM list when the first intra-prediction mode is not comprised in the MPM list, wherein the set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX).

In one embodiment, the method further comprises:

when a quantity of intra prediction modes in the MPM list is less than a threshold, the left neighboring block of the current coding block is available and the above neighboring block of the current coding block is available, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In an example, after operation six, when the MPM list is still not full, the left neighboring block of the current coding block is available and the above neighboring block of the current coding block is also available, adding intra prediction mode in a default mode list into the MPM list when this mode or these modes are not in the MPM list, iterate this operation until the MPM list is full.

Operation seven: adding a vertical mode (VER_IDX), a horizontal mode (HOR_IDX), an intra mode 2 (2), a vertical diagonal mode (VDIA_IDX) or a diagonal mode (DIA_IDX) into the MPM list.

For example, when a vertical mode is not in the MPM list and the MPM list is not full, add the vertical mode into the MPM list, when the MPM list is full after adding the vertical mode, finish construction of the MPM list.

And when the MPM list is still not full after add the vertical mode, check whether a horizontal mode is in the MPM list. When the horizontal mode is in the MPM list, check whether an intra mode 2 is in the MPM list; when the intra mode 2 is not in the MPM list, add the intra mode 2 into the MPM list. Iterate this operation until the MPM list is full.

In one embodiment, the method further comprises: adding a vertical mode (VER_IDX), a horizontal mode (HOR_IDX), a VER_IDX add an offset −4 or a VER_IDX add an offset 4 into the MPM list.

In one embodiment, the method further comprises: adding a vertical mode (VER_IDX), a horizontal mode (HOR_IDX), a VER_IDX add an offset 4 or a VER_IDX add an offset −4 into the MPM list.

In an example, after operation six, when the MPM list is still not full, adding intra prediction mode in a default mode list into the MPM list when this mode or these modes are not in the MPM list, iterate this operation until the MPM list is full.

Operation seven: adding a vertical mode (VER_IDX), a horizontal mode (HOR_IDX), a VER_IDX add an offset −4 or a VER_IDX add an offset 4 into the MPM list into the MPM list; or adding a vertical mode (VER_IDX), a horizontal mode (HOR_IDX), a VER_IDX add an offset 4 or a VER_IDX add an offset −4 into the MPM list into the MPM list.

For example, when a vertical mode is not in the MPM list and the MPM list is not full, add the vertical mode into the MPM list, when the MPM list is full after adding the vertical mode, finish construction of the MPM list.

And when the MPM list is still not full after adding the vertical mode, check whether a horizontal mode is in the MPM list. When the horizontal mode is in the MPM list, check whether a prediction mode which value is equal to the value of VER_IDX add an offset −4 is in the MPM list; when the prediction mode which value is equal to the value of VER_IDX add an offset −4 is not in the MPM list, add the prediction mode which value is equal to the value of VER_IDX add an offset −4 into the MPM list. Iterate this operation until the MPM list is full.

In an example, after operation six, when the MPM list is still not full and the left neighboring block of the current coding block is not available, adding intra prediction mode in a default mode list into the MPM list when this mode or these modes are not in the MPM list, iterate this operation until the MPM list is full.

Operation seven: adding a vertical mode (VER_IDX), a vertical diagonal mode (VDIA_IDX), a diagonal mode (DIA_IDX) or an intra mode 2 (2) into the MPM list.

For example, when a vertical mode is not in the MPM list and the MPM list is not full, add the vertical mode into the MPM list, when the MPM list is full after adding the vertical mode, finish construction of the MPM list.

And when the MPM list is still not full after adding the vertical mode, check whether a vertical diagonal mode is in the MPM list. When the vertical diagonal mode is in the MPM list, check whether a diagonal mode is in the MPM list; when the diagonal mode is not in the MPM list, add the diagonal mode into the MPM list. Iterate this operation until the MPM list is full.

In an example, after operation six, when the MPM list is still not full, the above neighboring block of the current coding block is not available, adding intra prediction mode in a default mode list into the MPM list when this mode or these modes are not in the MPM list, iterate this operation until the MPM list is full.

Operation seven: adding a horizontal mode (HOR_IDX), an intra mode 2 (2), a diagonal mode (DIA_IDX) or a vertical diagonal mode (VDIA_IDX) into the MPM list.

For example, when a horizontal mode is not in the MPM list and the MPM list is not full, add the horizontal mode into the MPM list, when the MPM list is full after adding the horizontal mode, finish construction of the MPM list.

And when the MPM list is still not full after adding the horizontal mode, check whether an intra mode 2 is in the MPM list. When the intra mode 2 is in the MPM list, check whether a diagonal mode is in the MPM list; when the diagonal mode is not in the MPM list, add the diagonal mode into the MPM list. Iterate this operation until the MPM list is full.

In an example, after operation six, when the MPM list is still not full, the left neighboring block of the current coding block is available and the above neighboring block of the current coding block is available, adding intra prediction mode in a default mode list into the MPM list when this mode or these modes are not in the MPM list, iterate this operation until the MPM list is full.

Operation seven: adding a vertical mode (VER_IDX), a horizontal mode (HOR_IDX), a VER_IDX add an offset −4 or a VER_IDX add an offset 4 into the MPM list.

In an example, pre-defined default modes are provided: namely, a vertical mode (VER_IDX), a horizontal mode (HOR_IDX), an intra mode 2 (2), a vertical diagonal mode (VDIA_IDX) or a diagonal mode (DIA_IDX), to construct MPM list when it is not full. Two additional approaches regarding these defaults modes are proposed. They are adaptive default approach and changed default approach.

The approach using adaptive modes considers blocks that are located at left-most and top-most of a frame.

For blocks located at the left boundary of a frame, the horizontal mode is unlikely to be used because the source prediction samples that locate in the left neighboring block of the current block do not exist. Also, the modes in general using horizontal modes (i.e. DIA_IDX, mode 2) have a lower chance.

For blocks located at the top boundary of a frame, the vertical mode is unlikely to be used because the source prediction samples are locate in the above neighboring block of the current block do not exist. Also, the modes in general has a lower chance of using vertical modes (i.e. VDIA_IDX, DIA_IDX).

In one embodiment, the following boundary-aware approach is used:

When the left neighboring block of the current coding block does not exist, the following modes are used as the default candidate modes: VER_IDX, VDIA_IDX, DIA_IDX, mode 2.

Otherwise (e.g., left neighboring block exists):

When the above neighboring block of the current coding block does not exist, the following modes are used as the default candidate modes: HOR_IDX, mode 2, DIA_IDX, VDIA_IDX.

Otherwise (e.g., above neighboring block exists), use the normal default modes: VER_IDX, HOR_IDX, an intra mode 2 (2), VDIA_IDX or DIA_IDX.

The changed default approach adds the following candidate modes to the MPM list: VER, HOR, VER-4, VER+4. The order of VER-4 and VER+4 can be swapped.

One combination of these two methods can be:

When the left neighboring block of the current coding block does not exist, then using following modes in order as the default candidate modes: VER_IDX, VDIA_IDX, DIA_IDX, mode 2.

Otherwise (left neighboring block exists):

When the above neighboring block of the current coding block does not exist, then using following modes in order as the default candidate modes: HOR_IDX, mode 2, DIA_IDX, VDIA_IDX.

Otherwise (above neighboring block exists), use the changed default modes: VER_IDX, HOR_IDX, VER, HOR, VER-4, VER+4.

In one aspect of the present disclosure, a simplified method to construct the 6-entry MPM list is proposed, comprising: check the availability of current coding units' left neighboring block. The position of the left neighboring block is illustrated by FIG. 5, wherein the left neighboring block is labeled by "L".

The left neighboring block is not available when no intra prediction information (i.e. intra prediction mode) can be derived from the left neighboring block. It includes the following cases:

The left neighboring block is not an intra-predicted block; the left neighboring block does not exist, for example, the current block is a coding block located in the left-most side of a frame; When encoder or decoder support parallel processing, the left neighboring block might be considered as not existing (or not available) when it is located in different Tiles of or with the current block, i.e. the current coding block locates or is located in the left-most side of a Tile.

In another example, when parallel processing is not supported in an encoder or decoder, the left neighboring block might be considered as available when it is located in different Tiles of the current block, i.e. the current coding block locates in the left-most side of a Tile.

When parallel processing is supported in encoder or decoder, the left neighboring block might be considered as not existing when it is located in the different Slices with the current block, i.e. the current coding block locates in the left-most side of a slice.

In another example, when parallel processing is not supported in encoder or decoder, the left neighboring block might be considered as available when it is located in the different Slices with the current block, i.e. the current coding block locates in the left-most side of a slice.

Otherwise (i.e., left neighboring block is available), include the intra prediction mode of the left neighboring block in the 6-entry MPM list.

Check the availability of current coding units' above neighboring block. The position of the above neighboring block is illustrated by FIG. 5, wherein the above neighboring block is labeled by "A".

The above neighboring block is not available when no intra prediction information (i.e. intra prediction mode) can be derived from the above neighboring block. It includes the following cases:

The above neighboring block is not an intra-predicted block.

The above neighboring block does not exist. For example, the current block is a coding block located in the top-most side of a frame.

When parallel processing is supported in encoder or decoder, the top block might be considered as not existing when it is located in the different Tiles with the current block, i.e. the current coding block locates in the top-most side of a Tile.

In another example, when parallel processing is not supported in encoder or decoder, the top block might be considered as available when it is located in the different Tiles with the current block, i.e. the current coding block locates in the top-most side of a Tile.

When parallel processing is supported in encoder or decoder, the top block might be considered as not existing when it is located in the different Slices with the current block, i.e. the current coding block locates in the top-most side of a slice.

In another example, when parallel processing is not supported in encoder or decoder, the top block might be considered as available when it is located in the different Slices with the current block, i.e. the current coding block locates in the top-most side of a slice.

When it is needed to constrain line buffer size in encoder or decoder, the top block might be considered as not existing when it is located in the different CTU with the current block, i.e. the current coding block locates in the top-most side of the current CTU.

In an example, when decoder side or encoder side support line buffer restriction, then an above neighboring block located on different CTU with the current block CTU is considered as not existing. When the decoder side or encoder side does not support line buffer restriction, then the above neighboring block located on different CTU with the current block CTU is considered as existing.

Otherwise (i.e., left neighboring block is available), include the intra prediction mode of the top block in the 6-entry MPM list.

Check whether planar (PLANAR_IDX=0) mode has been inserted in the MPM list, (i.e. check either intra mode of the left and the top block are planar mode), only when planar mode has not been inserted in the MPM list, then insert the planar mode into the MPM list. Check whether DC (DC_IDX=1) mode has been inserted in the MPM list, (i.e. check either intra modes of the left and the top block are DC mode), only when DC mode has not been inserted in the MPM list, then insert the DC mode into the MPM list.

When the left neighboring block is available and when its intra prediction mode is an angular mode, i.e. (mode>DC_IDX, e.g., mode is angularLeft), get its nearest two angular modes by performing angularLeft-1, angularLeft+1. Note that when performing -1 or +1 it might involve a wrap up and wrap down operation, for example, When angularLeft is 2, then angularLeft-1 would be 66 (wrap up case), or when angularLeft is 66, then angularLeft+1 would be 2 (wrap down case).

When the prediction mode of angularLeft−1 has not been inserted into the MPM list, insert it into the MPM list.

When the prediction mode of angularLeft+1 has not been inserted into the MPM list, inserted it into the MPM list.

When MPM list is not full and when the above neighboring block is available and when its intra prediction mode is an angular mode, i.e. (mode>DC_IDX, and say mode is angularAbove), get its nearest two angular modes by performing angularAbove−1, angularAbove+1. Note that when performing −1 or +1 it might involve a wrap up and wrap down operation, in an example, when angularLeft is 2, then angularLeft−1 would be 66 (wrap up case), or when angularLeft is 66, then angularLeft+1 would be 2 (wrap down case).

When the prediction mode of angularAbove-1 has not been inserted into the MPM list, insert it into the MPM list.

When MPM list is not full (for example, a quantity of prediction modes in the MPM list is less than 6) and when the prediction mode of angularAbove+1 has not been inserted into the MPM list, insert it into the MPM list.

When the MPM list is not full, insert the following modes to MPM list until it is full (for example, a quantity of prediction modes in the MPM list is equal to 6): a vertical mode (VER_IDX), a horizontal mode (HOR_IDX), an intra mode 2 (2), a vertical diagonal mode (VDIA_IDX) or a diagonal mode (DIA_IDX).

Summary of variations of the proposed method:

The availability of left neighboring block shall consider both, to support or not to support parallel processing.

The availability of above neighboring block shall consider both, to support or not to support parallel processing.

The order to derive the two nearest modes of the left and above neighboring block can also be +1 first and then −1.

The last candidate of MPM list can either be VIDA_IDX or DIA_IDX.

The order of insertion can also be Left, above, Planar, DC, and default modes (VER_IDX, HOR_IDX, 2, VDIA_IDX or DIA_IDX).

For the signaling of mpm_idx, truncated unary binarization is used according to one embodiment. The first three bins of the mpm_idx are allowed to use three different independent contexts or all the bins of the mpm_idx are CABAC by pass coded.

In an example, derivation process for luma intra prediction mode is disclosed,

Input to this process are:
a luma location (xCb, yCb) specifying the top-left sample of the current luma coding block relative to the top-left luma sample of the current picture,
a variable cbWidth specifying the width of the current coding block in luma samples,
a variable cbHeight specifying the height of the current coding block in luma samples.
In this process, the luma intra prediction mode IntraPredModeY[xCb][yCb] is derived.

Table 8-1 specifies the value for the intra prediction mode IntraPredModeY[xCb][yCb] and the associated names.

Table 8-1—Specification of Intra Prediction Mode and Associated Names

TABLE 8-1

Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 77 | INTRA_CCLM |

NOTE: The intra prediction mode INTRA_CCLM is only applicable to chroma components.

IntraPredModeY[xCb][yCb] can be derived by the following operations:

The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX and addModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX and addModeX are derived as follows:

When one or more of the following conditions are true, candIntraPredModeX is set equal to a value other than 0 to 66 (for example, the value is −1), inclusive, and addModeX is set to FALSE.

The variable availableX is equal to FALSE.

CuPredMode[xNbX][yNbX] is not equal to MODE_INTRA.

X is equal to B and yCb−1 is less than ((yCb>>CtbLog2SizeY)<<CtbLog2SizeY).

Otherwise, candIntraPredModeX is set equal to IntraPredModeY[xNbX][yNbX] and addModeX is set to TRUE. The variable mIdx is set equal to 0. The candModeList[x] with x=0 ... 5 is derived as follows:

Note, a mode is an angular mode when and only when it is between mode 2 to 66, inclusive.

When neither of candIntraPredModeA and candIntraPredModeB are angular modes, the following applies:
candModeList[0]=INTRA_PLANAR
candModeList[1]=INTRA_DC
candModeList[2]=INTRA_ANGULAR50
candModeList[3]=INTRA_ANGULAR18
candModeList[4]=INTRA_ANGULAR46
candModeList[5]=INTRA_ANGULAR54

Otherwise (at least one of candIntraPredModeA and candIntraPredModeB is angular mode).

When addModeA equals to TRUE, candModeList [mIdx] is set equal to candIntraPredModeA and mIdx is incremented by 1.

When addModeB is equal to TRUE and mIdx is equal to 0, candModeList [mIdx] is set equal to candIntraPredModeB and mIdx is incremented by 1.

When addModeB is equal to TRUE and mIdx is equal to 1 and candIntraPredModeB is not equal to candModeList [0], candModeList [mIdx] is set equal to candIntraPredModeB and mIdx is incremented by 1.

When INTRA_PLANAR is not equal to candModeList [i] for any i=0 ... mIdx−1, modeList[mIdx] is set equal to INTRA_PLANAR and mIdx is incremented by 1.

When INTRA_DC is not equal to candModeList [i] for any i=0 . . . mIdx−1, modeList[mIdx] is set equal to INTRA_DC and mIdx is incremented by 1.

When both candIntraPredModeA and candIntraPredModeB are between mode 2 to 66 and candIntraPredModeA is not equal to candIntraPredModeB, Set the variable angMinus equals to 2+((candIntraPredModeA+62) % 65), Set the variable angPlus equals to 2+((candIntraPredModeA−1) % 65), When candIntraPredModeB equals to angMinus, then candModeList [mIdx] is set equal to 2+((candIntraPredModeB+62) % 65) and mIdx is incremented by 1.

candModeList [mIdx] is set equal to angPlus.

Otherwise (candIntraPredModeB is not equal to angMinus), candModeList [mIdx] is set equal to angMinus and mIdx is incremented by 1.

When candIntraPredModeB is equal to angPlus, candModeList [mIdx] is set equal to 2+((candIntraPredModeB-1) % 65).

Otherwise (candIntraPredModeB is not equals to angPlus), candModeList [mIdx] is set equal to angPlus Otherwise (only candIntraPredModeA is between mode 2 to 66, or only candIntraPredModeB is between mode 2 and 66, or candIntraPredModeA equals to candIntraPredModeB and they are between mode 2 to 66).

When candIntraPredModeA is greater than mode 2, the variable Angular is set to candIntraPredModeA.

Otherwise (candIntraPredModeA is not greater than mode 2), Angular is set to candIntraPredModeB.

When Angular ranges between mode 49 to 51, inclusive, the variable finalMode is set to 18.

Otherwise (Angular is not between mode 49 to 51, inclusive), the variable finalMode is set to 50.

candModeList [mIdx] is set equal to 2+((Angular+62) % 65) and mIdx is incremented by 1.

candModeList [mIdx] is set equal to 2+((Angular−1) % 65) and mIdx is incremented by 1.

candModeList [mIdx] is set equal to finalMode.

IntraPredModeY[xCb][yCb] is derived by applying the following procedure:

When intra_luma_mpm_flag[xCb][yCb] is equal to 1, the IntraPredModeY[xCb][yCb] is set equal to candModeList [intra_luma_mpm_idx[xCb][yCb]].

Otherwise, IntraPredModeY[xCb][yCb] can be derived by applying the following operations:

The array candModeList[x], x=0 . . . 5 is modified by the following ordered operations:

For i sequentially equals to 0 to 4, inclusive, apply:

For j sequentially equals to i+1 to 5, inclusive, compare candModeList[i] to candModeList [j], When candModeList[i] is greater than candModeList[j], both values are swapped as follows:

(candModeList[i], candModeList[j])=Swap(candModeList [i], candModeList[j]).

IntraPredModeY[xCb][yCb] is derived by the following ordered operations:

IntraPredModeY[xCb][yCb] is set equal to intra_luma_mpm_remainder[xCb][yCb].

For i equal to 0 to 5, inclusive, when IntraPredModeY[xCb][yCb] is greater than or equal to candModeList[i], the value of IntraPredModeY[xCb][yCb] is incremented by one.

The variable IntraPredModeY[x][y] with x=xCb . . . xCb+cbWidth−1 and y=yCb . . . yCb+cbHeight−1 is set to be equal to IntraPredModeY[xCb][yCb].

The present disclosure targets improvement in the intra mode signaling scheme. In the present disclosure, a video decoding method and a video decoder are proposed.

In another aspect of the present application, a decoder comprising processing circuitry is disclosed configured for carrying out the above decoding methods.

In another aspect of the present application, a computer program product is disclosed which comprising a program code for performing the above decoding methods.

In another aspect of the present application, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above decoding methods.

The processing circuitry can be implemented in hardware, or in a combination of hardware and software, for example by a software programmable processor or the like.

In another aspect of the present application, an encoding method is disclosed, which comprising: obtaining a intra prediction mode of a picture block from a plurality of intra prediction mode, the plurality of intra prediction modes for the picture block comprises a set of Most Probable Modes, MPMs, and a set of non-MPMs, wherein the set of non-MPMs comprises a first set of intra prediction modes and a second set of intra prediction modes; when the intra prediction mode of the picture block is in the set of non-MPMs, generating a mapping relationship between at least one intra prediction mode in the first set of intra prediction modes and at least one intra prediction mode in the set of non-MPMs; encoding the intra prediction mode of the picture block to obtain an intra prediction mode codeword according to the mapping relationship.

In one embodiment, the process of obtaining a intra prediction mode of a picture block can refers to the relative disclosure in the below detailed description of embodiments part, or the relative disclosure in the field of video coding technology, such as in the ITU-T H.264, ITU-T H.265.

In one embodiment, the encoding method further comprising: generating a set of MPMs, determining whether the intra prediction mode of the picture block is in the set of MPMs. Hence, when the intra prediction mode of the picture block is not in the set of MPMs, then the intra prediction mode of the picture block is in the set of non-MPMs.

The process of generating a set of MPMs can refers to the relative disclosure in the description part, or the relative disclosure in the field of video coding technology, such as in the ITU-T H.264, ITU-T H.265.

In one embodiment, the process of generating a mapping relationship between at least one intra prediction mode in the first set of intra prediction modes and at least one intra prediction mode in the set of non-MPMs can refers to the relative disclosure in the decoding side.

In one embodiment, a first set of intra prediction modes is coded using 5 bits and a second set of intra prediction modes is coded using 6 bits.

In another aspect of the present application, an encoder comprising processing circuitry is disclosed configured for carrying out the above encoding methods.

In another aspect of the present application, a computer program product is disclosed which comprising a program code for performing the above encoding methods.

In another aspect of the present application, an encoder for encoding video data is disclosed, the encoder comprising: one or more processors; and a non-transitory computer-readable storage medium coupled to the processors and storing programming for execution by the processors, wherein the programming, when executed by the processors, configures the encoder to carry out the above encoding methods.

The processing circuitry can be implemented in hardware, or in a combination of hardware and software, for example by a software programmable processor or the like.

Embodiment 1. A method for constructing a Most Probable Mode, MPM, list for intra prediction, the method comprising:

determining whether a left neighboring block (for example, block L in FIG. 5) of a current coding block is available or not (for example, when there is no intra prediction mode of the left neighboring block, the left neighboring block is not available, when there is an intra prediction mode of the left neighboring block, the left neighboring block is available);

determining whether an above neighboring block (for example, block A in FIG. 5) of the current coding block is available or not (for example, when there is no intra prediction mode of the above neighboring block, the above neighboring block is not available, when there is an intra prediction mode of the left neighboring block, the above neighboring block is available);

using a Planar mode, a DC mode, a vertical mode (VER_IDX), a horizontal mode (HOR_IDX), an intra prediction mode corresponding to the vertical mode with an offset −4, an intra prediction mode corresponding to the vertical mode with an offset 4 (for example, the MPM list is (0, 1, 50, 18, 46, 54), the value 0 corresponding to the Planar mode, the value 1 corresponding to the DC mode, the value 50 corresponding to the vertical mode, the value 18 corresponding to the horizontal mode, the value 46 corresponding to the intra prediction mode corresponding to the vertical mode with an offset −4, the value 54 corresponding to the intra prediction mode corresponding to the vertical mode with an offset 4), when one of the following conditions is satisfied:

the left neighboring block of the current coding block is not available and the above neighboring block of the current coding block is not available;

the left neighboring block of the current coding block is not available, the above neighboring block of the current coding block is available and an intra prediction mode of the above neighboring block is Planar mode;

the left neighboring block of the current coding block is not available, the above neighboring block of the current coding block is available and an intra prediction mode of the above neighboring block is DC mode;

the left neighboring block of the current coding block is available, the above neighboring block of the current coding block is not available and an intra prediction mode of the left neighboring block is Planar mode;

the left neighboring block of the current coding block is available, the above neighboring block of the current coding block is not available and an intra prediction mode of the left neighboring block is DC mode;

the left neighboring block of the current coding block is available, the above neighboring block of the current coding block is available, an intra prediction mode of the left neighboring block is not an angular mode (i.e. the intra prediction mode of the left neighboring block is Planar mode or DC mode), and an intra prediction mode of the above neighboring block is not an angular mode (i.e. the intra prediction mode of the above neighboring block is Planar mode or DC mode).

Embodiment 2. A method for constructing a Most Probable Mode, MPM, list for intra prediction, the method comprising:

determining whether a left neighboring block (for example, block L in FIG. 5) of a current coding block is available or not (for example, when there is no intra prediction mode of the left neighboring block, the left neighboring block is not available, when there is an intra prediction mode of the left neighboring block, the left neighboring block is available, and when the left neighboring block is available, an intra prediction mode of the left neighboring block is obtained);

when the left neighboring block is available (for example, the intra prediction mode of the left neighboring block is an angular mode, that's mean a value corresponding to the intra prediction mode of the left neighboring block is greater than or equal to 2, the range of the value may be from 2 to 66, the value also could equal to 66; or a value corresponding to the intra prediction mode of the left neighboring block is 0 (Planar mode) or 1 (DC mode)), adding an intra prediction mode of the left neighboring block into the MPM list (for example, an initial MPM list is an empty list, and in this operation, the intra prediction mode of the left neighboring block is added into the MPM list).

Embodiment 3. A method for constructing a Most Probable Mode, MPM, list for intra prediction, the method comprising:

determining whether an above neighboring block (for example, block A in FIG. 5) of the current coding block is available or not (for example, when there is no intra prediction mode of the above neighboring block, the above neighboring block is not available, when there is an intra prediction mode of the above neighboring block, the above neighboring block is available, and when the above neighboring block is available, an intra prediction mode of the above neighboring block is obtained);

when an above neighboring block is available (for example, the intra prediction mode of the above neighboring block is an angular mode, that's mean a value corresponding to the intra prediction mode of the above neighboring block is greater than or equal to 2, the range of the value may be from 2 to 66, the value also could equal to 66; or a value corresponding to the intra prediction mode of the above neighboring block is 0 (Planar mode) or 1 (DC mode)) and the intra prediction mode of the above neighboring block is not comprised in the MPM list, adding the intra prediction mode of the above neighboring block into the MPM list (for example, an initial MPM list is an empty list, and in this operation, the intra prediction mode of the above neighboring block is added into the MPM list; or the MPM list comprises the intra prediction mode of the left neighboring block, and the intra prediction mode of the above neighboring block is different with the intra prediction mode of the left neighboring block, so the intra prediction mode of the above neighboring block is added into the MPM list, there are two intra prediction modes in the MPM list (one value corresponding to the intra prediction mode of the left neighboring block and one value corresponding to the intra prediction mode of the above neighboring block)).

Embodiment 4. The method of embodiment 2 or 3, wherein the method further comprises:

when the left neighboring block is not available or an intra prediction mode of the left neighboring block is not an angular mode (for example, there is no intra prediction mode of the left neighboring block, or the intra prediction mode of the left neighboring block is Planar mode, or the intra prediction mode of the left neighboring block is DC mode) and an intra prediction mode of the above neighboring block is an angular mode (for example, a value corresponding to the intra prediction mode of the above neighboring block is greater than or equal to 2, the range of the value may be from 2 to 66, the value also could equal to 66), and when the intra prediction mode of the above neighboring block is not comprised in the MPM list, adding the intra prediction mode of the above neighboring block into the MPM list (in an example, as an initial MPM list is an empty list or only comprises no angular modes, when the left neighboring block is not available or an intra prediction mode of the left neighboring block is not an angular mode, adding the intra prediction mode of the above neighboring block into the MPM list. Because in this situation, the intra prediction mode of the above neighboring block is clearly not comprised in the MPM list, it don't need to determine whether the intra prediction mode of the above neighboring block is comprised in the MPM list or not).

Embodiment 5. The method of embodiment 4, wherein the method further comprises:

when a Planar mode is not comprised in the MPM list, adding the Planar mode into the MPM list (in an example, after adding the intra prediction mode of the above neighboring block into the MPM list, to determine whether to add the planar mode into the MPM list or not).

Embodiment 6. The method of embodiments 4 or 5, wherein the method further comprises:

when a DC mode is not comprised in the MPM list, adding the DC mode into the MPM list (in an example, after adding the intra prediction mode of the above neighboring block into the MPM list, to determine whether to add the DC mode into the MPM list or not. In another example, after determine whether to add the Planar mode into the MPM list or not, then to determine whether to add the DC mode into the MPM list or not).

Embodiment 7. The method of any of embodiments 4 to 6, wherein the method further comprises:

adding an offset to the prediction mode of the above neighboring block to obtain an above-offset prediction mode, when the above-offset prediction mode is not comprised in the MPM list, adding the above-offset prediction mode into the MPM list (in an example, this operation could be processed after adding the intra prediction mode of the above neighboring block into the MPM list.

In another example, this operation could be processed after determine whether to add the Planar mode into the MPM list or not. In another example, this operation could be processed after determine whether to add the DC mode into the MPM list or not).

Embodiment 8. The method of embodiment 7, wherein the offset is −1.

Embodiment 9. The method of embodiment 7, wherein the offset is 1 (in an example, two offsets are added to the prediction mode of the above neighboring block to obtain an above-offset prediction mode and other above-offset prediction mode, when the above-offset (the offset is −1) prediction mode is not comprised in the MPM list, adding the above-offset prediction mode into the MPM list, and when the other above-offset (the offset is 1) prediction mode is not comprised in the MPM list, adding the other above-offset prediction mode into the MPM list).

Embodiment 10. The method of any one of embodiments 4 to 9, wherein the method further comprises:

when a vertical mode is not comprised in the MPM list, adding the vertical mode into the MPM list (in an example, this operation could be processed after adding the intra prediction mode of the above neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the above-offset prediction mode into the MPM list).

Embodiment 11. The method of any one of embodiments 4 to 10, wherein the method further comprises:

when a horizontal mode is not comprised in the MPM list, adding the horizontal mode into the MPM list (in an example, this operation could be processed after adding the intra prediction mode of the above neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the above-offset prediction mode into the MPM list. In another example, this operation could be processed after determine whether to add the vertical mode into the MPM list).

Embodiment 12. The method of any one of embodiments 4 to 10, wherein the method further comprises:

when a horizontal mode is not comprised in the MPM list and a quantity of intra prediction modes in the MPM list is smaller than a threshold (for example, the threshold is 6), adding the horizontal mode into the MPM list (in an example, this operation could be processed after adding the intra prediction mode of the above neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the above-offset prediction mode into the MPM list. In another example, this operation could be processed after determine whether to add the vertical mode into the MPM list).

Embodiment 13. The method of embodiment 2 or 3, wherein the method further comprises:

when the above neighboring block is not available or an intra prediction mode of the above neighboring block is not an angular mode (for example, there is no intra prediction mode of the above neighboring block, or the intra prediction mode of the above neighboring block is Planar mode, or the intra prediction mode of the above neighboring block is DC mode) and an intra prediction mode of the left neighboring block is an angular mode (for example, a value corresponding to the intra prediction mode of the left neighboring block is greater than or equal to 2, the range of the value may be from 2 to 66, the value also could equal to 66), and when the intra prediction mode of the left neighboring block is not comprised in the MPM list, adding the intra prediction mode of the left neighboring block into the MPM list (in some examples, as the intra prediction mode of left neighboring block is an angular mode, it will be added into the MPM list, in this example, it don't need to determine whether the intra prediction mode of the left neighboring block is comprised in the MPM list or not).

Embodiment 14. The method of embodiment 13, wherein the method further comprises:
when a Planar mode is not comprised in the MPM list, adding the Planar mode into the MPM list (in an example, after adding the intra prediction mode of the left neighboring block into the MPM list, to determine whether to add the planar mode into the MPM list or not).

Embodiment 15. The method of embodiment 13 or 14, wherein the method further comprises:
when a DC mode is not comprised in the MPM list, adding the DC mode into the MPM list (in an example, after adding the intra prediction mode of the left neighboring block into the MPM list, to determine whether to add the DC mode into the MPM list or not. In another example, after determine whether to add the Planar mode into the MPM list or not, then to determine whether to add the DC mode into the MPM list or not).

Embodiment 16. The method of any of embodiments 13 to 15, wherein the method further comprises:
adding an offset to the prediction mode of the left neighboring block to obtain an left-offset prediction mode, when the left-offset prediction mode is not comprised in the MPM list, adding the left-offset prediction mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not).

Embodiment 17. The method of embodiment 16, wherein the offset is −1.

Embodiment 18. The method of embodiment 16, wherein the offset is 1 (in an example, two offsets are added to the prediction mode of the left neighboring block to obtain an left-offset prediction mode and other left-offset prediction mode, when the left-offset (the offset is −1) prediction mode is not comprised in the MPM list, adding the a left-offset prediction mode into the MPM list, and when the other left-offset (the offset is 1) prediction mode is not comprised in the MPM list, adding the other left-offset prediction mode into the MPM list).

Embodiment 19. The method of any one of embodiments 13 to 18, wherein the method further comprises:
when a vertical mode is not comprised in the MPM list, adding the vertical mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list).

Embodiment 20. The method of any one of embodiments 13 to 19, wherein the method further comprises:
when a horizontal mode is not comprised in the MPM list, adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 21. The method of any one of embodiments 13 to 19, wherein the method further comprises:
when a horizontal mode is not comprised in the MPM list and a quantity of intra prediction modes in the MPM list is smaller than a threshold (for example, the threshold is 6), adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 22. The method of embodiment 2, wherein the method further comprises: determining whether an above neighboring block (for example, block A in FIG. 5) of the current coding block is available or not (for example, when there is no intra prediction mode of the above neighboring block, the above neighboring block is not available, when there is an intra prediction mode of the above neighboring block, the above neighboring block is available);
when an intra prediction mode of the above neighboring block is an angular mode (for example, a value corresponding to the intra prediction mode of the above neighboring block is greater than or equal to 2, the range of the value may be from 2 to 66, the value also could equal to 66) and the intra prediction mode of the above neighboring block is comprised in the MPM list (for example, the intra prediction mode of the above neighboring block is same as the intra prediction mode of the left neighboring block),
when a Planar mode is not comprised in the MPM list, adding the Planar mode into the MPM list (in an example, as the intra prediction mode of the left neighboring block and the intra prediction mode of the above neighboring block are angular modes, so the Planar mode is added into the MPM list).

Embodiment 23. The method of embodiment 22, wherein the method further comprises:
when a DC mode is not comprised in the MPM list, adding the DC mode into the MPM list (In another example, after determine whether to add the Planar mode into the MPM list or not, then to determine whether to add the DC mode into the MPM list or not. In an example, as the intra prediction mode of the left neighboring block and the intra prediction mode of the above neighboring block are angular modes, so the DC mode is added into the MPM list).

Embodiment 24. The method of embodiments 22 or 23, wherein the method further comprises:
adding an offset to the prediction mode of the left neighboring block to obtain an left-offset prediction mode, when the left-offset prediction mode is not in the MPM list, adding the left-offset prediction mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not).

Embodiment 25. The method of embodiment 24, wherein the offset is −1.

Embodiment 26. The method of embodiment 24, wherein the offset is 1 (in an example, two offsets are added to the prediction mode of the left neighboring block to obtain an left-offset prediction mode and other left-offset prediction mode, when the left-offset (the offset is −1) prediction mode is not comprised in the MPM list, adding the a left-offset prediction mode into the MPM list, and when the other left-offset (the offset is 1) prediction mode is not comprised in the MPM list, adding the other left-offset prediction mode into the MPM list).

Embodiment 27. The method of any one of embodiments 22 to 26, wherein the method further comprises:

when a vertical mode is not comprised in the MPM list, adding the vertical mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list).

Embodiment 28. The method of any one of embodiments 22 to 27, wherein the method further comprises:

when a horizontal mode is not comprised in the MPM list, adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 29. The method of any one of embodiments 22 to 27, wherein the method further comprises:

when a horizontal mode is not comprised in the MPM list and a quantity of intra prediction modes in the MPM list is smaller than a threshold (for example, the threshold is 6), adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 30. The method of embodiment 2, wherein the method further comprises: determining whether an above neighboring block (for example, block A in FIG. 5) of the current coding block is available or not (for example, when there is no intra prediction mode of the above neighboring block, the above neighboring block is not available, when there is an intra prediction mode of the above neighboring block, the above neighboring block is available);

when an intra prediction mode of the above neighboring block is an angular mode, the intra prediction mode of the left neighboring block is an angular mode (for example, a value corresponding to the intra prediction mode of the above neighboring block is greater than or equal to 2, the range of the value may be from 2 to 66, the value also could equal to 66) and the intra prediction mode of the above neighboring block is not comprised in the MPM list (for example, the intra prediction mode of the left neighboring block is different from the intra prediction mode of the above neighboring block), adding the intra prediction mode of the above neighboring block into the MPM list (for example, the MPM list comprises the intra prediction mode of the left neighboring block, and the intra prediction mode of the above neighboring block is different with the intra prediction mode of the left neighboring block, so the intra prediction mode of the above neighboring block is added into the MPM list, there are two intra prediction modes in the MPM list (an intra mode corresponding to left neighboring block and an intra mode corresponding to above neighboring block)).

Embodiment 31. The method of embodiment 30, wherein the method further comprises:

when a Planar mode is not comprised in the MPM list, adding the Planar mode into the MPM list (in an example, after adding the intra prediction mode of the above neighboring block into the MPM list, to determine whether to add the planar mode into the MPM list or not; in another example, as the intra prediction mode of the left neighboring block and the intra prediction mode of the above neighboring block both are angular modes, in the operation, the Planar mode is added into the MPM list).

Embodiment 32. The method of embodiment 30 and 31, wherein the method further comprises:

when a DC mode is not comprised in the MPM list, adding the DC mode into the MPM list (in an example, after adding the intra prediction mode of the above neighboring block into the MPM list, to determine whether to add the DC mode into the MPM list or not. In another example, after determine whether to add the Planar mode into the MPM list or not, then to determine whether to add the DC mode into the MPM list or not; in another example, as the intra prediction mode of the left neighboring block and the intra prediction mode of the above neighboring block both are angular modes, in the operation, the DC mode is added into the MPM list).

Embodiment 33. The method of any one of embodiments 30 to 32, wherein the method further comprises:

adding an offset (for example, −1) to the prediction mode of the left neighboring block to obtain an left-offset prediction mode, when the left-offset prediction mode is comprised in the MPM list, adding an offset (for example, −1) to the prediction mode of the above neighboring block to obtain an above-offset prediction mode, adding the above-offset prediction mode into the MPM list.

Embodiment 34. The method of any one of embodiments 30 to 33, wherein the method further comprises:

adding an offset (for example, −1) to the prediction mode of the left neighboring block to obtain an left-offset prediction mode, when the left-offset prediction mode is not comprised in the MPM list, adding the left-offset prediction mode into the MPM list.

Embodiment 35. The method of any one of embodiments 30 to 34, wherein the method further comprises:

adding an offset (for example, −1) to the prediction mode of the left neighboring block to obtain an left-offset prediction mode, adding another offset (for example, 1) to the prediction mode of the left neighboring block to obtain another left-offset prediction mode, when the left-offset prediction mode is comprised in the MPM list, adding the another left-offset prediction mode into the MPM list.

Embodiment 36. The method of any one of embodiments 30 to 34, wherein the method further comprises:

adding an offset (for example, −1) to the prediction mode of the left neighboring block to obtain an left-offset prediction mode, when the left-offset prediction mode is comprised in the MPM list, adding another offset (for example, 1) to the prediction mode of the left neighboring block to obtain another left-offset prediction mode, adding the another left-offset prediction mode into the MPM list.

Embodiment 37. The method of any one of embodiments 30 to 32, wherein the method further comprises:

adding an offset (for example, −1) to the prediction mode of the left neighboring block to obtain an left-offset prediction mode, when the left-offset prediction mode is comprised in the MPM list, adding an offset (for example, −1) to the prediction mode of the above neighboring block to obtain an above-offset prediction mode, adding the above-offset prediction mode into the MPM list;

adding another offset (for example, 1) to the prediction mode of the left neighboring block to obtain another left-offset prediction mode, adding the another left-offset prediction mode into the MPM list.

Embodiment 38. The method of embodiment 34, wherein the method further comprises:

adding another offset (for example, 1) to the prediction mode of the left neighboring block to obtain another left-offset prediction mode, when the another left-offset prediction mode is not comprised in the MPM list, adding the another left-offset prediction mode into the MPM list.

Embodiment 39. The method of embodiment 34 or 38, wherein the method further comprises:

adding another offset (for example, 1) to the prediction mode of the left neighboring block to obtain another left-offset prediction mode, when the another left-offset prediction mode is comprised in the MPM list, adding another offset (for example, 1) to the prediction mode of the above neighboring block to obtain another above-offset prediction mode, adding the another above-offset prediction mode into the MPM list.

Embodiment 40. The method of embodiment 2, wherein the method further comprises:

determining whether an above neighboring block (for example, block A in FIG. 5) of the current coding block is available or not (for example, when there is no intra prediction mode of the above neighboring block, the above neighboring block is not available, when there is an intra prediction mode of the above neighboring block, the above neighboring block is available, and when the above neighboring block is available, an intra prediction mode of the above neighboring block is obtained);

when the above neighboring block is not available or an intra prediction mode of the above neighboring block is not an angular mode (for example, there is no intra prediction mode of the above neighboring block, or the intra prediction mode of the above neighboring block is Planar mode, or the intra prediction mode of the above neighboring block is DC mode) and an intra prediction mode of the left neighboring block is an angular mode (for example, a value corresponding to the intra prediction mode of the left neighboring block is greater than or equal to 2, the range of the value may be from 2 to 66, the value also could equal to 66), when a Planar mode is not comprised in the MPM list, adding the Planar mode into the MPM list (in an example, after adding the intra prediction mode of the left neighboring block into the MPM list, to determine whether to add the planar mode into the MPM list or not).

Embodiment 41. The method of embodiment 40, wherein the method further comprises:

when a DC mode is not comprised in the MPM list, adding the DC mode into the MPM list (in an example, after adding the intra prediction mode of the left neighboring block into the MPM list, to determine whether to add the DC mode into the MPM list or not. In another example, after determine whether to add the Planar mode into the MPM list or not, then to determine whether to add the DC mode into the MPM list or not).

Embodiment 42. The method of embodiment 40 or 41, wherein the method further comprises:

adding an offset to the prediction mode of the left neighboring block to obtain an left-offset prediction mode, when the left-offset prediction mode is not comprised in the MPM list, adding the left-offset prediction mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not).

Embodiment 43. The method of embodiment 42, wherein the offset is −1.

Embodiment 44. The method of embodiment 42, wherein the offset is 1 (in an example, two offsets are added to the prediction mode of the left neighboring block to obtain an left-offset prediction mode and other left-offset prediction mode, when the left-offset (the offset is −1) prediction mode is not comprised in the MPM list, adding the a left-offset prediction mode into the MPM list, and when the other left-offset (the offset is 1) prediction mode is not comprised in the MPM list, adding the other left-offset prediction mode into the MPM list).

Embodiment 45. The method of any one of embodiments 40 to 44, wherein the method further comprises:

when a vertical mode is not comprised in the MPM list, adding the vertical mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list).

Embodiment 46. The method of any one of embodiments 40 to 45, wherein the method further comprises:

when a horizontal mode is not comprised in the MPM list, adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 47. The method of any one of embodiments 40 to 46, wherein the method further comprises:

when a horizontal mode is not comprised in the MPM list and a quantity of intra prediction modes in the MPM list is smaller than a threshold (for example, the threshold is 6), adding the horizontal mode into the MPM list (in an example, this operation could be processed after adding the intra prediction mode of the left neighboring block into the MPM list. In another example, this operation could be processed after determine whether to add the Planar mode into the MPM list or not. In another example, this operation could be processed after determine whether to add the DC mode into the MPM list or not. In another example, this operation could be processed after determine whether to add the left-offset prediction mode into the MPM list. In another example, this operation could be processed after determine whether to add the vertical mode into the MPM list).

Embodiment 48. An encoder comprising processing circuitry for carrying out the method according to any one of embodiments 1 to 47.

Embodiment 49. A decoder comprising processing circuitry for carrying out the method according to any one of embodiments 1 to 47.

Embodiment 50. A computer program product comprising a program code for performing the method according to any one of embodiments 1 to 47.

Embodiment 51. A decoder for construct a Most Probable Mode, MPM, list, comprises:
one or more processors; and
a non-transitory computer-readable storage medium coupled to the processors and storing programming for execution by the processors, wherein the programming, when executed by the processors, configures the decoder to carry out the method according to any one of embodiments 1 to 47.

Embodiment 52. An encoder for construct a Most Probable Mode, MPM, list, comprising:
one or more processors; and
a non-transitory computer-readable storage medium coupled to the processors and storing programming for execution by the processors, wherein the programming, when executed by the processors, configures the encoder to carry out the method according to any one of embodiments 1 to 47.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise need a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A decoder for intra prediction of a video block, comprises:
   one or more processors; and
   a non-transitory computer-readable storage medium coupled to the one or more processors and storing programming for execution by the one or more processors, wherein the programming, when executed by the one or more processors, configures the decoder to:
   determine whether a left neighboring block of a current coding block is available;
   determine whether an above neighboring block of the current coding block is available;
   use a Planar mode, a DC mode, a vertical mode (VER_IDX), a horizontal mode (HOR_IDX), an intra prediction mode corresponding to the vertical mode with an offset −4, an intra prediction mode corresponding to the vertical mode with an offset 4, orderly, as a set of most probable modes (MPMs), when the left neighboring block of the current coding block is available, the above neighboring block of the current coding block is not available and an intra prediction mode of the left neighboring block is determined to be a DC mode;

generate a mapping relationship between at least one intra prediction mode in the MPMs and at least one intra prediction mode in a set of non-MPMs;

obtain a value of an MPM flag for the current coding block;

obtain an MPM index value for the current coding block, wherein the MPM index value is used to indicate an index position from the set of most probable modes;

obtain a value of the intra prediction mode for the current coding block based on the value of the MPM flag for the current coding block, the MPM index value for the current coding block and the mapping relationship, wherein when the value of the MPM flag for the current coding block is 1 and the MPM index value for the current coding block is 0, the intra prediction mode for the current coding block is determined to be a Planar mode from the set of most probable modes.

2. The decoder of claim 1, wherein when the value of the MPM flag for the current coding block is 0, the intra prediction mode for the current coding block is not equal to any one of the following intra prediction modes:

a Planar mode, a DC mode, a vertical mode (VER_IDX), a horizontal mode (HOR_IDX), an intra prediction mode corresponding to the vertical mode with an offset −4, or an intra prediction mode corresponding to the vertical mode with an offset 4.

3. A non-transitory computer-readable storage medium coupled to one or more processors and storing instructions for execution by the one or more processors, wherein the instructions, when executed by the one or more processors, configures a decoder to:

determine whether a left neighboring block of a current coding block is available;

determine whether an above neighboring block of the current coding block is available;

use a Planar mode, a DC mode, a vertical mode (VER_IDX), a horizontal mode (HOR_IDX), an intra prediction mode corresponding to the vertical mode with an offset −4, an intra prediction mode corresponding to the vertical mode with an offset 4, orderly, as a set of most probable modes (MPMs), wherein when the left neighboring block of the current coding block is available, the above neighboring block of the current coding block is not available and an intra prediction mode of the left neighboring block is determined to be a DC mode;

generate a mapping relationship between at least one intra prediction mode in the MPMs and at least one intra prediction mode in a set of non-MPMs;

obtain a value of an MPM flag for the current coding block;

obtain an MPM index value for the current coding block, wherein the MPM index value is used to indicate an index position from the set of most probable modes; and obtain a value of the intra prediction mode for the current coding block based on the value of the MPM flag for the current coding block, the MPM index value for the current coding block and the mapping relationship, wherein when the value of the MPM flag for the current coding block is 1 and the MPM index value for the current coding block is 0, the intra prediction mode for the current coding block is determined to be a Planar mode from the set of most probable modes.

4. The non-transitory computer-readable storage medium of claim 3, wherein when the value of the MPM flag for the current coding block is 0, the intra prediction mode for the current coding block is not equal to any one of the following intra prediction modes:

a Planar mode, a DC mode, a vertical mode (VER_IDX), a horizontal mode (HOR_IDX), an intra prediction mode corresponding to the vertical mode with an offset −4, or an intra prediction mode corresponding to the vertical mode with an offset 4.

5. A method for intra prediction of a video block, comprising:

determining whether a left neighboring block of a current coding block is available;

determining whether an above neighboring block of the current coding block is available;

using a Planar mode, a DC mode, a vertical mode (VER_IDX), a horizontal mode (HOR_IDX), an intra prediction mode corresponding to the vertical mode with an offset −4, an intra prediction mode corresponding to the vertical mode with an offset 4, orderly, as a set of most probable modes (MPMs), wherein when the left neighboring block of the current coding block is available, the above neighboring block of the current coding block is not available and an intra prediction mode of the left neighboring block is determined to be a DC mode;

generating a mapping relationship between at least one intra prediction mode in the MPMs and at least one intra prediction mode in a set of non-MPMs;

obtaining a value of an MPM flag for the current coding block;

obtaining an MPM index value for the current coding block, wherein the MPM index value is used to indicate an index position from the set of most probable modes; and obtaining a value of the intra prediction mode for the current coding block based on the value of the MPM flag for the current coding block, the MPM index value for the current coding block and the mapping relationship, wherein when the value of the MPM flag for the current coding block is 1 and the MPM index value for the current coding block is 0, the intra prediction mode for the current coding block is determined to be a Planar mode from the set of most probable modes.

6. The method of claim 5, wherein when the value of the MPM flag for the current coding block is 0, the intra prediction mode for the current coding block is not equal to any one of the following intra prediction modes:

a Planar mode, a DC mode, a vertical mode (VER_IDX), a horizontal mode (HOR_IDX), an intra prediction mode corresponding to the vertical mode with an offset −4, or an intra prediction mode corresponding to the vertical mode with an offset 4.

* * * * *